(12) United States Patent
Mihara et al.

(10) Patent No.: US 10,395,101 B2
(45) Date of Patent: Aug. 27, 2019

(54) INTEREST DEGREE DETERMINATION DEVICE, INTEREST DEGREE DETERMINATION METHOD, AND NON-TRANSITORY COMPUTER-READABLE RECORDING MEDIUM

(71) Applicant: FUJITSU LIMITED, Kawasaki-shi, Kanagawa (JP)

(72) Inventors: Motonobu Mihara, Kawasaki (JP); Akinori Taguchi, Kawasaki (JP); Masayoshi Shimizu, Hadano (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 15/203,085

(22) Filed: Jul. 6, 2016

(65) Prior Publication Data

US 2017/0011260 A1 Jan. 12, 2017

(30) Foreign Application Priority Data

Jul. 9, 2015 (JP) .................................. 2015-137948

(51) Int. Cl.
*G06K 9/00* (2006.01)
*G06Q 30/02* (2012.01)
*G06T 7/73* (2017.01)

(52) U.S. Cl.
CPC ..... *G06K 9/00335* (2013.01); *G06K 9/00248* (2013.01); *G06K 9/00315* (2013.01); *G06K 9/00355* (2013.01); *G06Q 30/02* (2013.01); *G06Q 30/0201* (2013.01); *G06T 7/74* (2017.01); *G06T 2207/30201* (2013.01)

(58) Field of Classification Search
None
See application file for complete search history.

(56) References Cited

U.S. PATENT DOCUMENTS

| 8,401,248 B1 | 3/2013 | Moon et al. |
| 2004/0001616 A1 | 1/2004 | Gutta et al. |

(Continued)

FOREIGN PATENT DOCUMENTS

| JP | 63-85890 A | 4/1988 |
| JP | 2007-286995 A | 11/2007 |

(Continued)

OTHER PUBLICATIONS

Pantic M et al., "Automatic Analysis of Facial Expressions: The State of the Art", IEEE Transactions on Pattern Analysis and Machine Intelligence, IEEE Computer Society, USA, vol. 22, No. 12, Dec. 1, 2000 (pp. 1424-1445).

(Continued)

*Primary Examiner* — Vikkram Bali
(74) *Attorney, Agent, or Firm* — Westerman, Hattori, Daniels & Adrian, LLP

(57) ABSTRACT

An interest degree determination device detects a gaze position of a first user included in a plurality of users on the basis of image information. When a second user other than the first user is present in the vicinity of the first user, the interest degree determination device determines whether the gaze position of the first user has been affected by the second user. The interest degree determination device stores a determination result of a determination unit and the gaze position of the first user in a storage unit so as to be associated with each other.

17 Claims, 20 Drawing Sheets

(56) References Cited

U.S. PATENT DOCUMENTS

| | | |
|---|---|---|
| 2007/0247524 A1 | 10/2007 | Yoshinaga et al. |
| 2008/0004951 A1 | 1/2008 | Huang et al. |
| 2009/0299814 A1 | 12/2009 | Grigsby et al. |
| 2013/0054377 A1* | 2/2013 | Krahnstoever ......... G09F 27/00 705/14.66 |
| 2016/0275314 A1* | 9/2016 | Thorn .................... G06F 3/013 |

FOREIGN PATENT DOCUMENTS

| | | |
|---|---|---|
| JP | 2009-193499 A | 8/2009 |
| JP | 2012-187190 A | 10/2012 |
| JP | 2013-20311 A | 1/2013 |
| JP | 2010-94493 A | 4/2014 |
| JP | 2014-92886 A | 5/2014 |

OTHER PUBLICATIONS

Search Report dated Oct. 26, 2016, issued in counterpart European Application No. 16177978.0 (7 pages).

Satoh et al., "Robust Object Detection by Radial Reach Filter"., IEICE vol. J86-D2, No. 5 pp. 616-624, May 2003 Translation of Abstract.

Seya et al., "Objective and Subjective Sizes of the Effective Visual Field during Game Playing Measured by the Gaze-contingent Window Method"., International Journal of Affective Engineering, vol. 12, No. 1 pp. 11-19, Apr. 2013.

Office Action dated Apr. 10, 2019, issued in counterpart EP Application No. 16177978.0. (8 pages).

* cited by examiner

FIG.3

| FRAME NUMBER | TIME | NUMBER OF PERSONS DETECTED | PERSON ID | PERSON REGION | COORDINATES OF CENTER OF GRAVITY | FRAME | PLURAL FLAG | SINGULAR FLAG | SUCCESS FLAG |
|---|---|---|---|---|---|---|---|---|---|
| 001 | t1 | 0 | | | | FRAME WITH FRAME NUMBER 001 | OFF | OFF | OFF |
| 002 | t2 | 1 | 1aaa | l1*m1 | (U1, V1) | FRAME WITH FRAME NUMBER 002 | OFF | ON | ON |
| 003 | t3 | 1 | 1aaa | l2*m2 | (U2, V2) | FRAME WITH FRAME NUMBER 003 | OFF | ON | ON |
| 004 | t4 | 2 | 1aaa<br>1bbb | l3*m3<br>l99*m99 | (U3, V3)<br>(J99, V99) | FRAME WITH FRAME NUMBER 004 | ON | OFF | ON<br>ON |
| 005 | t5 | 2 | 1aaa<br>1bbb | l4*m4<br>l99*m99 | (U4, V4)<br>(J99, V99) | FRAME WITH FRAME NUMBER 005 | ON | OFF | ON<br>ON |
| ⋮ | | | | | | | | | OFF |
| 0pq | tn | 1 | 1bbb | ln*mn | (Un, Vn) | FRAME WITH FRAME NUMBER 0pq | OFF | ON | OFF |

| IMAGE REGION IN VIRTUAL SPACE | PRODUCT |
|---|---|
| (X1, Y1) TO (X2, Y1)<br>(X1, Y2) TO (X2, Y2) | PRODUCT α |
| (X2, Y1) TO (X3, Y1)<br>(X2, Y2) TO (X3, Y2) | PRODUCT β |
| (X1, Y2) TO (X2, Y2)<br>(X1, Y3) TO (X2, Y3) | PRODUCT γ |
| (X2, Y2) TO (X3, Y2)<br>(X2, Y3) TO (X3, Y3) | PRODUCT δ |

|  | X1 | X2 | X3 |
|---|---|---|---|
| Y1 | PRODUCT α | PRODUCT β | |
| Y2 | PRODUCT γ | PRODUCT δ | |
| Y3 | | | |

| PERSON ID | 1aaa | | PERSON ID | 1bbb | |
|---|---|---|---|---|---|
| TIME | MOVE-MENT | GAZE TARGET | TIME | MOVE-MENT | GAZE TARGET |
| tn1 | no | PRODUCT α | tn1 | no | PRODUCT α |
| tn2 | no | PRODUCT α | tn2 | yes | PRODUCT α |
| tn3 | yes | PRODUCT α | tn3 | no | PRODUCT β |
| tn4 | yes | PRODUCT β | tn4 | yes | PRODUCT γ |
| ... | | | ... | | |

| PERSON ID | 1aaa | | PERSON ID | 1bbb | |
|---|---|---|---|---|---|
| TIME | GESTURE | GAZE TARGET | TIME | GESTURE | GAZE TARGET |
| tn1 | no | PRODUCT α | tn1 | no | PRODUCT α |
| tn2 | no | PRODUCT α | tn2 | yes | PRODUCT α |
| tn3 | yes | PRODUCT α | tn3 | no | PRODUCT β |
| tn4 | yes | PRODUCT β | tn4 | yes | PRODUCT γ |
| ... | | | ... | | |

| PERSON ID | 1aaa | | PERSON ID | 1bbb | |
|---|---|---|---|---|---|
| TIME | FINGER REGION CHANGE | GAZE TARGET | TIME | FINGER REGION CHANGE | GAZE TARGET |
| tn1 | no | PRODUCT α | tn1 | no | PRODUCT α |
| tn2 | no | PRODUCT α | tn2 | yes | PRODUCT α |
| tn3 | yes | PRODUCT α | tn3 | no | PRODUCT β |
| tn4 | yes | PRODUCT β | tn4 | yes | PRODUCT γ |
| ... | | | ... | | |

| PERSON ID | 1aaa | | PERSON ID | 1bbb | |
|---|---|---|---|---|---|
| TIME | GRASPING STATE | GAZE TARGET | TIME | GRASPING STATE | GAZE TARGET |
| tn1 | no | PRODUCT α | tn1 | no | PRODUCT α |
| tn2 | no | PRODUCT α | tn2 | yes | PRODUCT α |
| tn3 | yes | PRODUCT α | tn3 | no | PRODUCT β |
| tn4 | yes | PRODUCT β | tn4 | yes | PRODUCT γ |
| ... | | | ... | | |

| PERSON ID | 1aaa | | PERSON ID | 1bbb | |
|---|---|---|---|---|---|
| TIME | FACE DIRECTION CHANGE | GAZE TARGET | TIME | FACE DIRECTION CHANGE | GAZE TARGET |
| tn1 | no | PRODUCT α | tn1 | no | PRODUCT α |
| tn2 | no | PRODUCT α | tn2 | yes | PRODUCT α |
| tn3 | yes | PRODUCT α | tn3 | no | PRODUCT β |
| tn4 | yes | PRODUCT β | tn4 | yes | PRODUCT γ |
| ... | | | ... | | |

FIG.11

| PERSON ID | 1aaa | | PERSON ID | 1bbb | |
|---|---|---|---|---|---|
| TIME | DIS-TANCE | STATE OF MOUTH | TIME | DIS-TANCE | STATE OF MOUTH |
| tn1 | 50 | CLOSED | tn1 | 50 | CLOSED |
| tn2 | 50 | OPENED | tn2 | 50 | CLOSED |
| tn3 | 50 | CLOSED | tn3 | 50 | OPENED |
| tn4 | 50 | OPENED | tn4 | 50 | CLOSED |
| tn5 | 50 | CLOSED | tn5 | 50 | OPENED |
| ... | | | ... | | |
| tn10 | 50 | CLOSED | tn10 | 50 | CLOSED |

FIG.12

| | | 143g | | | |
|---|---|---|---|---|---|
| | 26a | | | 26b | |
| PERSON ID | 1aaa | | PERSON ID | 1bbb | |
| TIME | GAZE DE-TECTION | GAZE TARGET | TIME | GAZE DE-TECTION | GAZE TARGET |
| tn1 | no | | tn1 | yes | PRODUCT α |
| tn2 | yes | PRODUCT α | tn2 | yes | PRODUCT α |
| tn3 | yes | PRODUCT α | tn3 | yes | PRODUCT β |
| tn4 | yes | PRODUCT β | tn4 | no | |
| ... | | | ... | | |

| TIME | NUMBER OF PERSONS | PERSON ID | GAZE TARGET PRODUCT | SPONTANEITY FLAG |
|---|---|---|---|---|
| t2 | 1 | 1aaa | PRODUCT α | ON |
| t3 | 1 | 1aaa | PRODUCT α | ON |
| t4 | 2 | 1aaa | PRODUCT α | ON |
|  |  | 1bbb | PRODUCT β | OFF |
| t5 | 2 | 1aaa | PRODUCT α | OFF |
|  |  | 1bbb | PRODUCT β | OFF |
| t6 | 2 | 1aaa | PRODUCT γ | ON |
|  |  | 1bbb | PRODUCT β | ON |
| t7 | 2 | 1aaa | PRODUCT γ | ON |
|  |  | 1bbb | PRODUCT γ | ON |

INTEREST DEGREE DETERMINATION DEVICE, INTEREST DEGREE DETERMINATION METHOD, AND NON-TRANSITORY COMPUTER-READABLE RECORDING MEDIUM

CROSS-REFERENCE TO RELATED APPLICATION(S)

This application is based upon and claims the benefit of priority of the prior Japanese Patent Application No. 2015-137948, filed on Jul. 9, 2015, the entire contents of which are incorporated herein by reference.

FIELD

The embodiment discussed herein is related to an interest degree determination device.

BACKGROUND

There is a technique in related art that detects the gaze of a customer to detect a product in which the customer is interested and acquires marketing data of the product.

For example, the technique according to the related art acquires positional data for the position that the gaze of a customer crosses at the outer surface of a housing of a vending machine, temporarily stores the acquired positional data in a storage device, and appropriately transmits the positional data to, for example, a sales management center device.

Patent Document 1: Japanese Laid-open Patent Publication No. 2010-94493

However, the technique according to the related art has the problem that it is difficult to appropriately determine what products persons are interested in.

For example, when a person gazes at a certain object, there is a case in which the person is originally interested in the object or a case in which the person is affected by surrounding people.

SUMMARY

According to an aspect of an embodiment, an interest degree determination device includes a memory and a processor that executes a process including detecting a gaze position of a first user included in a plurality of users on the basis of image information; determining whether the gaze position of the first user has been affected by the second user, when a second user other than the first user is present in the vicinity of the first user; and storing a determination result of the determining and the gaze position of the first user so as to be associated with each other in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of the data structure of an image database;

FIG. 4 is a diagram illustrating an example of the data structure of a gaze target position database;

FIG. 5 is a diagram illustrating an example of a virtual space;

FIG. 6 is a diagram illustrating an example of the data structure of a person moving state check database;

FIG. 7 is a diagram illustrating an example of the data structure of a gesture check database;

FIG. 8 is a diagram illustrating an example of the data structure of a finger region change check -database;

FIG. 9 is a diagram illustrating an example of the data structure of a grasping state check database;

FIG. 10 is a diagram illustrating an example of the data structure of a face direction change check database;

FIG. 11 is a diagram illustrating an example of the data structure of a mouth moving state check database;

FIG. 12 is a diagram illustrating an example of the data structure of a gaze moving state check database;

DESCRIPTION OF EMBODIMENTS

Hereinafter, embodiments of an interest degree determination device, an interest degree determination method, and an interest degree determination program according to the invention will be described in detail with reference to the drawings. In addition, the invention is not limited by the embodiments.

Figure 1:
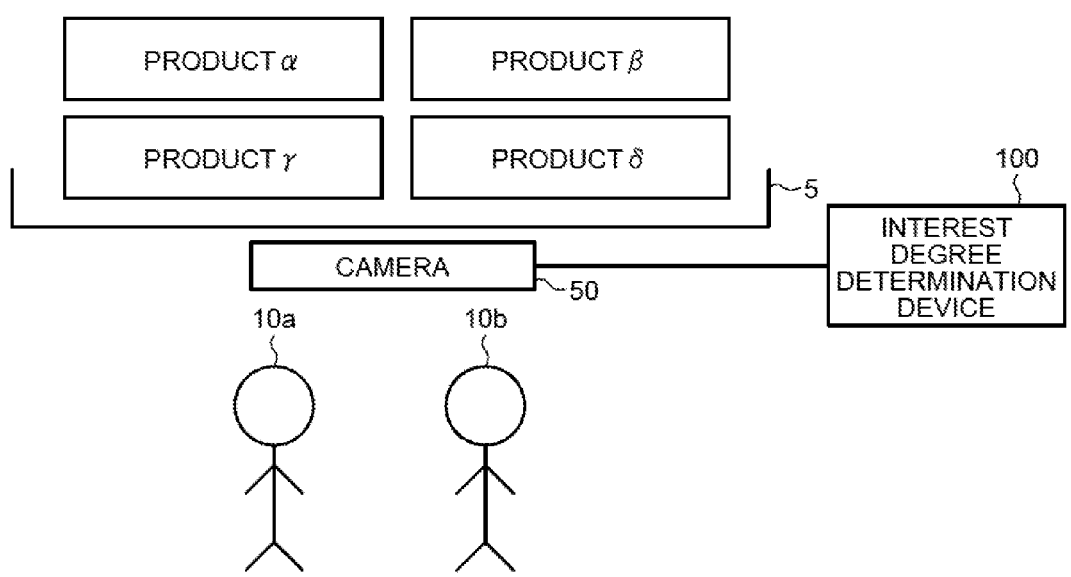
FIG. 1 is a diagram illustrating the structure of a system according to an embodiment.

FIG. 1 is a diagram illustrating the structure of a system according to an embodiment. As illustrated in FIG. 1, the system includes a camera 50 and an interest degree determination device 100. In addition, it is assumed that a product α, a product β, a product γ, and a product δ are displayed on a shelf 5 and the camera 50 is arranged such that a person who selects a product from the shelf 5 is included in an imaging range. Products other than the products α to δ may be displayed on the shelf 5.

The camera 50 captures an image in the imaging range. The camera 50 transmits information about the captured image to the interest degree determination device 100. In the following description, the information about the image is referred to as image data. It is assumed that the image data includes a plurality of consecutive frames.

The interest degree determination device 100 detects the gaze position of a person on the basis of the image data of the camera 50 and determines whether the gaze position of the person is a gaze position affected by another person or a spontaneous gaze position. The interest degree determination device 100 registers the gaze position of the person in a determination result database so as to be associated with the determination result.

For example, when determining whether the gaze position of a person 10a is a spontaneous gaze position, the interest degree determination device 100 uses any one of the gaze position, moving state, gesture, grasping state, face direction, and mouth movement of a person 10b or a combination of two or more of them.

Figure 2:
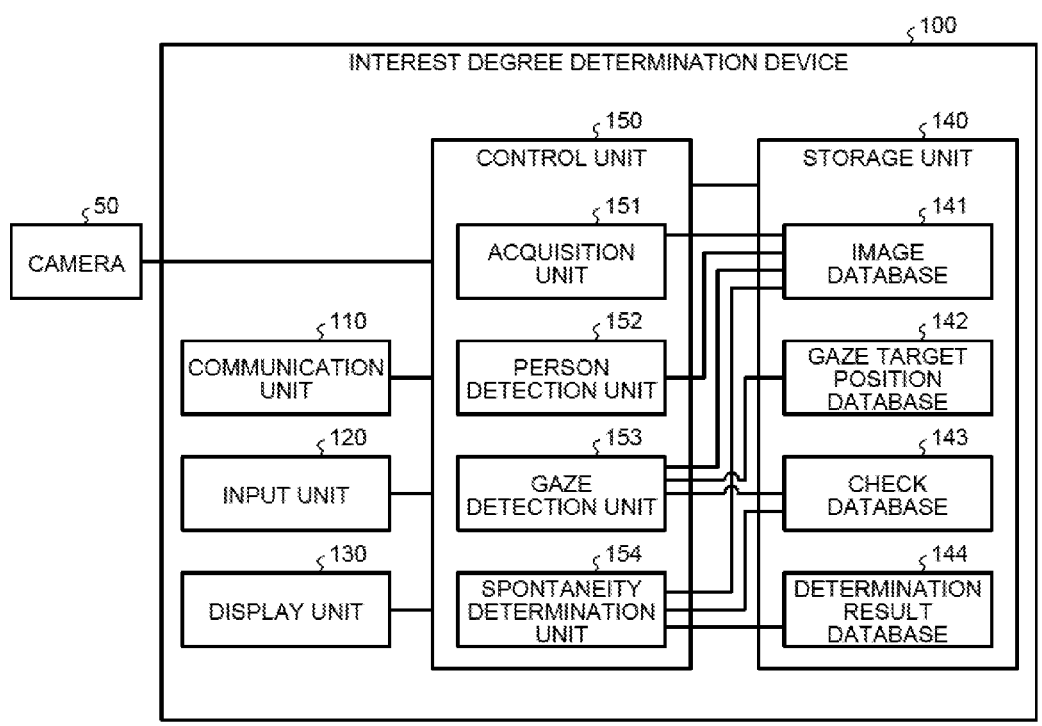
FIG. 2 is a functional block diagram illustrating the structure of an interest degree determination device according to this embodiment.

Next, the structure of the interest degree determination device 100 according to this embodiment will be described. FIG. 2 is a functional block diagram illustrating the structure of the interest degree determination device according to this embodiment. As illustrated in FIG. 2, the interest degree determination device 100 is connected to the camera 50. The interest degree determination device 100 includes a communication unit 110, an input unit 120, a display unit 130, a storage unit 140, and a control unit 150.

The communication unit 110 is a processing unit that performs data communication with other external devices through a network. For example, the communication unit 110 corresponds to a communication device.

The input unit 120 is an input device that inputs various kinds of information to the interest degree determination device 100. For example, the input unit 120 corresponds to a keyboard, a mouse, a touch panel, and an input button.

The display unit 130 is a display device that displays information transmitted from the control unit 150. For example, the display unit 130 corresponds to a touch panel or a liquid crystal display.

The storage unit 140 includes an image database 141, a gaze target position database 142, a check database 143, and a determination result, database 144. The storage unit 140 corresponds to a storage device which is a semiconductor memory device, such as a random access memory (RAM), a read only memory (ROM), or a flash memory.

The image, database 141 is a database, that stores information related to image data. FIG. 3 is a diagram illustrating an example of the data structure of the image database. As illustrated in FIG. 3, in the image database 141, a frame number, time, the number of persons detected, a person ID, a person region, the coordinates of the center of gravity, a frame, a plural flag, a singular flag, and a success flag are associated with one another. The frame number is a number for identifying each frame included in the image data. The time is the time of a frame.

The number of persons detected is the number of persons detected from the frame. The person ID is information for identifying the person who is detected from the frame. When the same person is detected from a plurality of frames, the same person ID is allocated to the person. The person region indicates a region of the person. For example, the person region is represented by a width and a length. The coordinates of the center of gravity indicate the center of gravity of the person region of the person detected from the frame.

The frame is an image of a frame corresponding to the frame number. The plural flag is a flag indicating whether a plurality of persons have been detected from the frame. When a plurality of persons have been detected, the plural flag is turned "on". When a plurality of persons have not been detected, the plural, flag is turned "off".

The singular flag is a flag indicating whether a single person has been detected from the frame. When a single person has been detected, the singular flag is turned "on". When a single person has not been detected, the singular flag is turned "off".

The success flag is a flag indicating whether the detection of the gaze position of the person has succeeded. When the detection of the gaze position of the person has succeeded, the success flag is turned "on". When the detection of the gaze position of the person has failed, the success flag is turned "off".

The gaze target position database 142 stores information in which an image region of a virtual space is associated with a product included in the image region. FIG. 4 is a diagram illustrating an example of the data structure of the gaze target position database. As illustrated in FIG. 4, the gaze target position database 142 associates the image region of the virtual space with a product.

FIG. 5 is a diagram illustrating an example of the virtual space. For example, the product α is located in a virtual space (X1, Y1) to (X2, Y1) and (X1, Y2) to (X2, Y2). The product β is located in a virtual space (X2, Y1) to (X3, Y1) and (X2, Y2) to (X3, Y2). The product γ is located in a virtual space (X1, Y2) to (X2, Y2) and (X1 Y3) to (X2, Y3). The product δ is located in a virtual space (X2, Y2) to (X3, Y2) and (X2, Y3) to (X3, Y3).

For example, when the gaze position of a person is included in an image region (X1, Y1) to (X2 Y1) and (X1, Y2) to (X2, Y2) of the virtual section, it is said that the person gazes at the product α.

The check database 143 includes a plurality of types of check databases 143. For example, the check database 143 includes a person moving state check database 143a, a gesture check database 143b, and a finger region change check database 143c. In addition, the check database 143 includes a grasping state check database 143d, a face direction change check database 143e, a mouth moving state check database 143f, and a gaze moving state check database 143g. Hereinafter, examples of the data structures of the check databases 143a to 143g will be sequentially described.

The person moving state check database 143a stores information about whether a person has approached a product. FIG. 6 is a diagram illustrating an example of the data structure of the person moving state check database. As illustrated in FIG. 6, the person moving state check database 143a has a table for each person ID. Here, for example, a table 20a for a person ID "1aaa" and a table 2Db for a person ID "1bbb" are illustrated.

In the tables 20a and 20b, time, movement, and a gaze target are associated with one another. The movement is information indicating whether a person corresponding to a person ID has approached a product which is a gaze target. When the person has approached the gaze target, the movement is "yes". When the person has not approached the gaze target, the movement is "no". The gaze target indicates a product at which the person corresponding to the person ID gazes. For example, a record in the first row of the table 20a indicates that a person corresponding to the person ID "1aaa" gazes at the product α, but has not approached the product α at a time tn1.

The gesture check database 143b stores information about whether a person made a large gesture. FIG. 7 is a diagram illustrating an example of the data structure of the gesture check database. As illustrated in FIG. 7, the gesture check database 143b has a table for each person ID. Here, for example, a table 21a for the person ID "1aaa" and a table 20b for the person ID "1bbb" are illustrated.

In the tables 21a and 21b, time, a gesture, and a gaze target are associated with one another. The gesture is information indicating whether a person corresponding to a person ID has made a large gesture. When, the person has made a large gesture, the gesture is "yes". When the person has not made a large gesture, the gesture is "no". The gaze target indicates a product at which the person corresponding to the person ID gazes. For example, a record in the first row of the table 21a indicates that the person with the person ID "1aaa" gazes at the product α and has not made a large gesture at the time tn1.

The finger region change check database 143c stores information about whether a finger region of a person has changed. FIG. 3 is a diagram illustrating an example of the data structure of the finger region change check database. As illustrated in FIG. 8, the finger region change check database 143c has a table for each person ID. Here, for example, a table 22a for the person ID "1aaa" and a table 22b for the person ID "1bbb" are illustrated.

In the tables 22a and 22b, time, a finger region change, and a gaze target are associated with one another. The finger region change is information indicating whether a finger region of a person corresponding to a person ID has changed. When the finger region of the person has changed, the finger region change is "yes". When the finger region of the person has not changed, the finger region change is "no". The gaze target indicates a product at which the person corresponding to the person ID. For example, a record in the first row of the table 22a indicates that the person with the person ID "1aaa" gazes at the product α and the finger region of the person has not changed at the time tn1.

The grasping state check database 143d stores information about whether a person grasps a product. FIG. 9 is a diagram illustrating an example of the data structure of the grasping state check database. As illustrated in FIG. 9, the grasping state check database 143d has a table for each person ID. Here, for example, a table 23a for the person ID "1aaa" and a table 23b for the person ID "1bbb" are illustrated.

In the tables 23a and 23b, time, a grasping state, and a gaze target are associated with one another. The grasping state is information indicating whether a person corresponding to a person ID is in a grasping state. When the person is in the grasping state, the grasping state is "yes". When the person is not in the grasping state, the grasping state is "no". The gaze target indicates a product at which the person corresponding to the person ID gazes. For example, a record in the first row of the table 23a indicates that the person with the person ID "1aaa" gazes at the product α and is not in the grasping state at the time tn1.

The face direction change check: database 143e stores information about whether there is a change in the face direction of a person, FIG. 10 is a diagram illustrating an example of the data structure of the face direction change check database. As illustrated in FIG. 10, the face direction change check database 143e has a table for each person ID. Here, for example, a table 24a for the person ID "1aaa" and a table 24b for the person ID "1bbb" are illustrated.

In the tables 24a and 24b, time, a face direction change, and a gaze target are associated with one another. The face direction change is information indicating whether the face direction of a person corresponding to a person ID has changed. When the face direction of the person has changed, the face direction change is "yes". When the face direction of the person has not changed, the face direction change is "no". The gaze target indicates a product at which the person corresponding to the person ID gazes. For example, a record in the first row of the table 24a indicates that the person with the person ID "1aaa" gazes at the product α and the face direction of the person has not changed at the time tn1.

The mouth moving state check database 143f stores information about the state of the mouth of a person. FIG. 11 is a diagram illustrating an example of the data, structure of the mouth moving state check database. As illustrated in FIG. 11, the mouth moving state check database 143f has a table for each person ID. Here, for example, a table 25a for the person ID "1aaa" and a table 25b for the person ID "1bbb" are illustrated.

In the tables 25a and 25b, time, a distance, and a mouth state are associated with one another. The distance indicates a distance between a person corresponding to a person ID and another person who is closest to the person. The mouth state is information indicating whether the mouth of the person corresponding to the person ID is opened or closed. For example, a record in the first row of the table 24a indicates that the distance between the person with the person ID "1aaa" and another person is "50 cm" and the mouth of the person is "closed" at the time tn1.

The gaze moving state check database 143g stores information about the detection of the gaze of a person. FIG. 12 is a diagram illustrating an example of the data structure of the gaze moving state check database. As illustrated in FIG. 12, the gaze moving state check database 143g has a table fox each person ID. Here, for example, a table 26a for the person ID "1aaa" and a table 26b for the person ID "1bbb" are illustrated, In the tables 26a and 26b, time, gaze detection, and a gaze target are associated with one another. The gaze detection is information indicating whether the gaze of a person corresponding to a person ID is detectable. For example, when the gaze of the person is detectable, the gaze detection is "yes". When the gaze of the person is not detectable, the gaze detection is "no". The gaze target indicates a product at which the person corresponding to the person ID gazes. For example, a record in the second row of the table 26a indicates that the person with the person ID "1aaa" gazes at the product α and the gaze of the person is detectable at a time tn2.

Figures 13, 14:
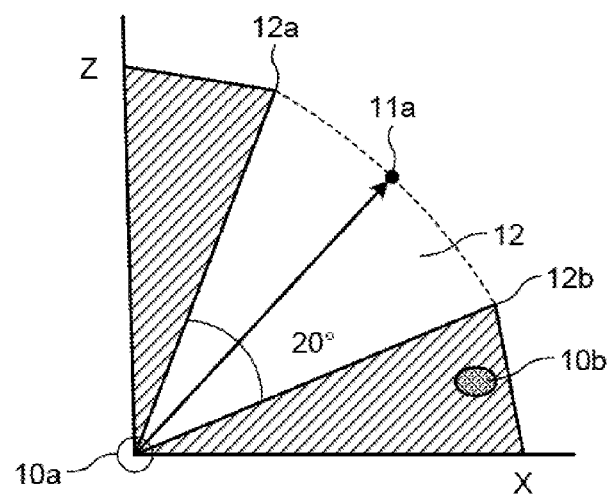
FIG. 13 is a diagram illustrating an example of the data structure of a determination result database.
FIG. 14 is a diagram illustrating an example of the field of view of a person.

The description returns to FIG. 2. The determination result database 144 stores information indicating whether or not a person spontaneously gazes at a product when the person gazes at the product. FIG. 13 is a diagram illustrating an example of the data structure of the determination result database. As illustrated in FIG. 13, in the determination result database 144, time, the number of persons, a person ID, a gaze target product, and a spontaneity flag are associated with one another. The number of persons indicates the number of persons who have been subjected to a spontaneity determination process. The gaze target product indicates a product at which the person gazes. The spontaneity flag indicates whether the person spontaneously gazes: at a product.

For example, a record in the first row of the determination result database 144 indicates that the person with the person ID "1aaa" spontaneously gazes at the product α at a time t1. A record in the second row indicates that the person with the person ID "1aaa" spontaneously gazes at the product α at a time t2. In addition, it is indicated that the person with the person ID "1bbb" does not spontaneously gaze at the product β at a time t2.

The description returns to FIG. 2. The control unit 150 includes an acquisition unit 151, a person detection unit 152, a gaze detection unit 153, and a spontaneity determination unit 154. The control unit 150 corresponds to an integrated device such as an application specific integrated circuit (ASIC) or a field programmable gate array (FPGA). In addition, the control unit 150 corresponds to an electronic circuit such as a central processing unit (CPU) or a micro processing unit (MPU). The spontaneity determination unit 154 is an example of a determination unit.

The acquisition unit 151 is a processing unit that acquires image data from the camera. The acquisition unit 151 registers the image data in the image database 141 illustrated in FIG. 3. For example, the acquisition unit 151 registers the image data in the image database 141 such that the frame number, the time, and the frame are associated with one another. The number of persons detected, the person ID, the person region, the coordinates of the center of gravity, the plural flag, the singular flag, and the success flag information in the image database 141 are set by the person detection unit 152 which will be described below.

The person detection unit 152 is a processing unit that detects a person from each frame of the image data with reference to the image database 141. For example, the person detection unit 152 has a template which defines the shapes of a plurality of types of persons and compares the template with the frames of the image data to detect persons.

When a person is detected from the frame, the person detection unit 152 registers a person region and the coordinates of the center of gravity in the image database 141 so as to be associated with the frame number. The person detection unit 152 registers the number of detected persons in the image database 141 so as to be associated with the frame number.

When a plurality of persons are detected, the person detection unit 152 sets the plural flag to "on" and sets the singular flag to "off". When a single person is detected, the person detection unit 152 sets the plural flag to "off" and sets the singular flag to "on". When no person is detected, the person detection unit 152 sets the plural flag to "off" and sets the singular flag to "off".

When a person is detected, the person detection unit 152 allocates a unique person ID to the detected person and registers the person ID in the image database 141 so as to be associated with the frame number. The person detection unit 152 allocates the same person ID to the same person detected from a plurality of frames. For example, when an overlap area between a person region of the person detected from a certain frame and a person region of the person detected from the next frame is equal to or greater than a predetermined area, the person detection unit 152 determines that the same person is detected from each frame.

When a plurality of persons are detected from a frame, the person detection unit 152 allocates a unique person ID to each person and registers the person IDs in the image database 141 so as to be associated with the frame number. For example, a plurality of persons are detected from a frame with a frame number "004" in the image database 141 illustrated in FIG. 3, the person ID of one person is "1aaa", and the person ID of another person is "1bbb".

When a hew person ID is detected, the person detection unit 152 may generate a table corresponding to each person ID in the check database 143 or other processing units may generate the table corresponding to each person ID.

In this embodiment, the person detection unit 152 detects persons from the frames of the image data, using template matching. However, the invention is not limited thereto. Other techniques according to the related art may be used to detect persons. For example, the person detection unit 152 may detect persons, using the technique disclosed in Japanese Laid-open Patent Publication No. 2014-92886. The person detection unit 152 may detect persons, using the technique disclosed in Non-patent Document (Yutaka Satoh, Shunichi Kaneko, Yoshinori Niwa, and Kazuhiko Yamamoto: "Robust Object Detection by Radial Reach Filter (FIR F)", Trans. IEICE (D-II), Vol. J86-D-II, No. 5, pp 616-624, 2003). In addition, when the number of persons included in frames is measured, the person detection unit 152 may measure the number of persons using the technique disclosed in Japanese Laid-open Patent Publication No. 63-085890.

The gaze detection unit 153 is a processing unit that detects the gaze position of a person, with reference, to the frame of the image data in the image database 141. The gaze detection unit 153 may detect the: gaze position of the person, using any technique according to the related art. For example, the gaze detection unit 153 performs image analysis for frames, specifies a reference point and a moving point, of the eye of a person, and detects the gaze position of the person from the relationship between the reference point and the moving point. A set of the reference point and the moving point is a set of the inner corner of the eye of the person and the iris or a set of the corneal reflection and the pupil of the eye of the person. The gaze detection unit 153 may detect, the gaze position, using the technique described in Japanese Laid-open Patent Publication No. 2012-187190.

The gaze detection unit 153 is capable of detecting the reference point and the moving point of the eye of a person. When the detection of the gaze of the person has succeeded, the gaze detection unit 153 sets the success flag to "on" in association with the person ID of the person of which the gaze detection has succeeded. On the other hand, when it is difficult to detect, the reference point or the moving point of the eye of the person and the detection, of the gaze of the person has failed, the gaze detection unit 153 sets the success flag to "off" in association with the person ID of the person of which the gaze detection has failed.

When the detection of the gaze of the person has succeeded, the gaze detection unit 153 compares the gaze position of the person with the gaze target position database 142 and specifies a product which is a gaze target of the person. The gaze detection unit 153 registers the time of the frame in which a gaze has been detected and a gaze target in the tables 20a to 24a, 26a, 20b to 24h, and 26b corresponding to each person ID included in the check database 143 so as to be associated with each other.

The spontaneity determination unit 154 is a processing unit that, when a certain person gazes at a product, determines whether the person spontaneously gazes at the product. The spontaneity determination unit 154 registers the determination result in the determination result database 144.

First, the spontaneity determination unit 154 detects a record in which the singular flag is "on" and the success flag is "on", with reference to the image database 141. The singular flag in the "on" state and the success flag in the "on" state mean, for example, that, one person gazes at a product and has spontaneity. The spontaneity determination unit 154 determines that the person with the person ID included in the detected record spontaneously gazes at a gaze target and registers the determination result, in the determination; result database 144.

For example, in a record corresponding to a frame number "002", the singular flag is "on" and the success flag is "on". Therefore, the spontaneity determination unit 154 determines that the person with the person ID "1aaa" in the record corresponding to the frame number "002" spontaneously gazes at a gaze target at the time "t2". The spontaneity determination unit 154 registers the time "t2", the number of persons "1", the person ID "1aaa", the gaze target "product α", and the spontaneity flag "on" in the determination result database 144 so as to be associated with one another.

Then, the spontaneity determination unit 154 detects a record in which the plural flag is "on" and the success flag is "on" with reference to the image database 141. The spontaneity determination unit 154 performs one or more of first to seventh spontaneity determination processes, which will be described below, for the persons with each person ID included in the record to determine whether the person spontaneously gazes at a product. In the following description, for convenience of explanation, it is assumed that there are persons 10a and 10b and a spontaneity determination process for determining whether the person 10a spontaneously gazes at a product is performed.

The "first spontaneity determination process" performed by the spontaneity determination unit 154 will be described. When the first spontaneity determination process is performed, the spontaneity determination unit 154 performs the process with reference to the person moving state check database 14 3a illustrated in FIG. 6.

When the person 10b moves in a direction in which the person approaches a gaze target and the current gaze target of the person 10a is the same as the gaze target of the person 10b for a period from a predetermined time ago to the present, the spontaneity determination unit 154 determines that the person 10a does not spontaneously gaze at the gaze target.

On the other hand, when the person 10b does not move in the direction in which the person approaches the gaze target, the spontaneity determination unit 154 determines that the person 10a spontaneously gazes at the gaze target. In addition, when the current gaze target of the person 10a is different from the gaze target of the person 10b for a period from a predetermined time ago to the present, the spontaneity determination unit 154 determines that the person 10a spontaneously gazes at the gaze target.

Here, an example of the process of the spontaneity determination unit 154 determining whether the person moves in the direction in which, the person approaches the gaze target will be described. The spontaneity determination unit 154 acquires the person region of the person with reference to the image database 141. The spontaneity determination unit 154 calculates an area which is surrounded by the outline of each person region for each frame and calculates the amount of change. For example, the spontaneity determination unit 154 specifies the outline of the person region using the technique described in Japanese Laid-open Patent Publication No. 2014-92886.

When an increase in the person region of the person is equal to or greater than a threshold value for a period of N frames, the spontaneity determination unit 154 determines that the person moves in the direction in which the person approaches the gaze target. When the increase in the person region of the person is not equal to or greater than the threshold value for a period of N frames, the spontaneity determination unit 154 determines that the person does not move in the direction in which the person approaches the gaze target. The spontaneity determination unit 154 registers the determination result in the person moving state check database 143a.

For example, when the increase in the person region of: the person is equal to or greater than the threshold value for a frame, period, from the time tn1 to the time tn3, the spontaneity determination unit 154 registers the movement "yes" in the record corresponding to the time "tn3" in the table corresponding to the person ID. When the increase in the person region of the person is not equal to or greater than the threshold value for the frame period from the time tn1 to the time tn3, the spontaneity determination unit 154 registers the movement "no" in the record corresponding to the time "tn3" in the table corresponding to the person ID.

After registering information in the person moving state check database 143a, the spontaneity determination unit 154 performs the first spontaneity determination process.

The "second spontaneity determination process" performed by the spontaneity determination unit 154 will be described. When performing the second spontaneity determination process, the spontaneity determination unit 154 performs the process with reference to the gesture check database 143b illustrated in FIG. 7.

When the gesture of the person 10b is large, the gesture of the person 10b is included in the field of view of the person 10a, and the current gaze target of the person 10a is the same as the gaze target of the person 10b for a period from a predetermined time ago to the present, the spontaneity determination unit 154 determines that the person 10a does not spontaneously gaze at the gaze target.

On the other hand, when the gesture of the person 10b is small, the spontaneity determination unit 154 determines that the person 10a spontaneously gazes at the gaze target. In addition, when the gesture of the person 10b is large and the gesture of the person 10b is not included in the field of view of the person 10a, the spontaneity determination unit 154 determines that, the person 10a spontaneously gazes at the gaze target. Furthermore, when the current gaze target of the person 10a is different from the gaze target, of the person 10b for the period from a predetermined time ago to the present, the spontaneity determination unit 154 determines that the person 10a spontaneously gazes at the gaze target.

Here, an example of the process of the spontaneity determination unit 154 determining whether the gesture of a person is large will be described. The spontaneity determination unit 154 specifies a person region of the person with reference to the image database 141 and extracts a hand region from the person region. For example, the spontaneity determination unit 154 extracts a flesh color, region of the person region as the hand region.

When the amount of movement of the hand region is equal, to or greater than a threshold value (m pixels) for a period of K frames, the spontaneity determination unit 154 determines that the gesture of the person is large. When the amount of movement of the hand region is not equal to or greater than the threshold value for a period of K frames, the spontaneity determination unit 154 determines that the gesture of the person is not large. For example, when the frame of the image data has a size 640×480 pixels, the threshold value is 95 pixels. The spontaneity determination unit 154 registers the determination result in the gesture check database 143b.

For example, when an increase in the hand region of the person is equal to or greater than the threshold value for a frame period from the time tn1 to the time tn3, the spontaneity determination unit 154 registers the gesture "yes" in the record corresponding to the time "tn3" in the table corresponding to the person ID. When the increase in the hand region of the person is not equal to or greater than the threshold value for the frame period from the time tn1 to the time tn3, the spontaneity determination unit 154 registers the gesture "no" in the record corresponding to the time "tn3" in the table corresponding to the person ID.

The spontaneity determination unit 154 may determine whether the gesture is large, using other techniques, according to the related art. For example, the spontaneity determination unit 154 may detect a gesture and determine whether the gesture is large, using the technique described in Japanese Laid-open Patent Publication No. 2013-20311.

After registering information in the gesture check database 143b, the spontaneity determination unit 154 performs the second spontaneity determination process.

Then, an example of the process of the spontaneity determination unit 154 determining whether the gesture of the person 10b is included in the field of view of the person 10a will be described. For example, when the person 10b is included in the field of view of the person 10a, the spontaneity determination unit 154 determines that the gesture of the person 10b is included in the field of view of the person 10a.

FIG. 14 is a diagram illustrating an example of the field of view of a person. In FIG. 14, when the gaze position of the person 10a is referred to as a gaze position 11a, the field of view of the person 10a is referred to as a field of view 12. For example, it is assumed that an angle formed between a segment 12a and a line 12b of the field of view 12 is 20 degrees. The angle of 20 degrees is based on "Characteristics of Effective Field of View and Method for Measuring Effective Field of View (Within, Diameter of 20°)", Optical Engineering Vol. 42, No. 9 (2013), P. 473. When the person 10b is included in the field of view 12, the spontaneity determination unit 154 determines that the gesture of the person 10b is included in the field of view of the person 10a. When the person 10b is not included in the field of view 12, the spontaneity determination unit 154 determines that the gesture of the person 10b is not included in the field of view of the person 10a. In the example illustrated in FIG. 14, the person 10b is not included in the field of view 12.

The spontaneity determination unit 154 may specify the position of a person using any method. For example, the spontaneity determination unit 154 specifies the distance from the camera 50 to the person, using a template in which the size of the person included in the frame of the image data and the size of the person on an image at each distance from the camera 50 are defined, and estimates the position of the person. The spontaneity determination unit 154 may specify the position of a person using other techniques according to the related art.

The "third spontaneity determination process" performed by the spontaneity determination unit 154 will be described. When performing the third spontaneity determination process, the spontaneity determination unit 154 performs the process with reference to the finger region change check database 143c illustrated, in FIG. 8.

When the amount of change in a finger region of the person 10b is equal to or greater than a threshold value, the finger region of the person 10b is included in the field of view of the person 10a, and the current gaze target of the person 10a is the same as the gaze target of the person 10b for a period from a predetermined time ago to the present, the spontaneity determination unit 154 determines that the person 10a does not spontaneously gaze at the gaze target.

On the other hand, when the amount of change in the finger region of the person 10b is not equal to or greater than the threshold value, the spontaneity determination unit 154 determines that the person 10a spontaneously gazes at the gaze target. When the amount of change in the finger region of the person 10b is equal to or greater than the threshold value and the finger region of the person 10b is not included in the field of view of the person 10a, the spontaneity determination unit 154 determines that the person 10a spontaneously gazes at the gaze target. When the current gaze target of the person 10a is different from the gaze target of the person 10b for the period from the predetermined time ago to the present, the spontaneity determination unit 154 determines that the person 10a spontaneously gazes at the gaze target.

Here, an example of the process of the spontaneity determination unit 154 determining whether the amount of change in the finger region of a person, is equal to or greater than the threshold value will be described. The spontaneity determination unit 154 specifies a person region of the person with reference to the image database 141 and extracts a finger region from the person region. For example, the spontaneity determination unit 154 extracts a flesh color region of the person region as the finger region.

When the amount of movement of the finger region is equal to or greater than a threshold value (p pixels) for a period of L frames, the spontaneity determination unit 154 determines that the amount of change in the finger region of the person is equal to or greater than the threshold value. When the amount, of movement of the finger region for a period of L frames is not equal to or greater than the threshold value, the spontaneity determination unit 154 determines that the amount, of change in the finger region of the person is not equal to or greater than the threshold value. For example, when the frame of the image data has a size 640×480 pixels, the threshold value is 95 pixels (corresponding to 20% of 480 pixels). The spontaneity determination unit 154 registers the determination result in the finger region change check database 143c.

For example, when an increase in the finger region of the person is equal to or greater than a threshold value for a frame period from the time tn1 to the time tn3, the spontaneity determination unit 154 registers the finger region change "yes" in the record corresponding to the time "tn3" in the table corresponding to the person ID. When the increase in the finger region of the person is not equal to or greater than the threshold value for the frame period from the time tn1 to the time tn3, the spontaneity determination unit 154 registers the finger region change "no" in the record corresponding to the time "tn3" in the table corresponding to the person ID.

After registering information in the finger region change check database 143c, the spontaneity determination unit 154 performs the third spontaneity determination process. The process of the spontaneity determination unit 154 determining whether the finger region of the person 10b is included in the field of view of the person 10a is the same as the process described in the second spontaneity determination process.

The spontaneity determination unit 154 may determine whether a change in the finger region is equal to or greater, than, a threshold value, using other techniques according to the related art. For example, the spontaneity determination unit 154 may detect a finger region and determine whether a change in the finger region, is equal to or greater than the threshold value, using the technique described in Japanese Laid-open Patent Publication No. 2013-20311.

The "fourth spontaneity determination process" performed by the spontaneity determination unit 154 will be described. When performing the fourth spontaneity determination process, the spontaneity determination unit 154 performs the process with reference to the grasping state check database 143d illustrated in FIG. 9.

The spontaneity determination unit 154 determines whether the hand of the person 10b is in a clenched state. When the hand of the person 10b in the clenched state is included in the field of view of the person 10a and the current gaze target of the person 10a is the same as the gaze target of the person 10b for a period from a predetermined time ago to the present, the spontaneity determination unit 154 determines that the person 10a does not spontaneously gaze at the gaze target.

On the other hand, when the hand of the person 10b is not in the clenched state, the spontaneity determination unit 154 determines that the person 10a spontaneously gazes at the gaze target. When the hand of the person 10b is in the clenched state and the state of the hand of the person 10b is not included in the field of view of the person 10a, the spontaneity determination unit 154 determines that the person 10a spontaneously gazes at the gaze target. Mien the current gaze target of the person 10a is different from the gaze target of the person 10b for the period from the predetermined time ago to the present, the spontaneity determination unit 154 determines that the person 10a spontaneously gazes at the gaze target.

Here, an example of the process of the spontaneity determination unit 154 determining whether the hand of the person is in the clenched state will be described. The spontaneity determination unit 154 specifies a person region of the person with reference to the image database 141 and extracts a hand region from the person region. For example, the spontaneity determination unit 154 extracts a flesh color region of the person region as the hand region.

For example, the spontaneity determination unit 154 compares the hand region with a template of the hand in the clenched state and determines that the hand of the person is in the clenched state when the hand region is matched with the template.

For example, when the hand region of the person is in the clenched state in the frame corresponding to the time tn3, the spontaneity determination unit 154 registers the grasping state "yes" in a record corresponding to the time "tn3" in the table corresponding to the person ID. When, the hand region of the person is not in the clenched state in the frame corresponding to the time tn3, the spontaneity determination unit 154 registers the grasping state "no" in the record corresponding to the time "tn3" in the table corresponding to the person ID.

After registering information in the grasping state check database 143d, the spontaneity determination unit 154 performs the fourth spontaneity determination process. The process of the spontaneity determination unit 154 determining whether the clenched state of the hand of the person 10b is included in the field of view of the person 10a is the same as the process described in the second spontaneity determination process.

The "fifth spontaneity determination process" performed by the spontaneity determination unit 154 will be described. When performing the fifth spontaneity determination process, the spontaneity determination unit 154 performs the process with reference to the face direction change check database 143e illustrated in FIG. 10.

The spontaneity determination unit 154 determines whether the face direction of the person 10b has changed. Then, when the face of the person 10b is included, in the field of view of the person 10a and the current gaze target of the person 10a is the same as the gaze target of the person 10b for a period from a predetermined time ago to the present, the spontaneity determination unit 154 determines that the person 10a does not spontaneously gaze at the gaze target.

On the other hand, when the face direction of the person 10b has not changed, the spontaneity determination unit 154 determines that the person 10a spontaneously gazes at the gaze target. When the face direction of the person 10b has changed and the face of the person 10b is not included in the field of view of the person 10a, the spontaneity determination unit 154 determines that the person 10a spontaneously gazes at the gaze target. When the current gaze target of the person 10a is different from the gaze target of the person 10b for the period from the predetermined time ago to the present, the spontaneity determination unit 154 determines that the person 10a spontaneously gazes at the gaze target.

Here, an example of the process of the spontaneity determination unit 154 determining whether the face direction of the person has changed will be described. The spontaneity determination unit 154 specifies a person region of the person with reference to the image database 141 and extracts a face region and an eye region from the person region. For example, the spontaneity determination unit 154 extracts a flesh color region, of the person region as the face region. Alternatively, the spontaneity determination unit 154 may extract the face region and the eye region from the person region, using a template which defines the structure of the face of the person. In addition, the spontaneity determination unit 154 may extract the face region and the eye region, using the process described in Japanese Laid-open Patent Publication No. 2012-137190.

When the amount of change in the aspect ratio of the face region for a period of P frames is equal to or greater than a first threshold value and a decrease in the proportion of the area of the eye region is equal to or greater than a second threshold value, the spontaneity determination unit 154 determines that the face direction of the person has changed. For example, when the amount of change in the aspect ratio of the face region is equal to or greater than 20% and a decrease in the proportion of the area of the region is equal to or greater than 20%, the spontaneity determination unit 154 determines that the face direction of the person has changed. On the other hand, when the amount of change in the aspect ratio of the face region for a period of P frames is not equal to or greater than the first threshold value or the decrease in the proportion of the area of the eye region is not equal to or greater than, the second threshold value, the spontaneity determination unit 154 determines that the face direction of the person has not changed. The spontaneity determination unit 154 registers the determination result in the face direction change check database 143e.

For example, when the amount of change in the aspect ratio of the face region of a person for a period from the time tn1 to the time tn3 is equal to or greater than the first threshold value and a decrease in the proportion of the area of the eye region is equal to or greater than the second threshold value, the spontaneity determination unit 154 registers the face direction change "yes" in the record corresponding to the time "tn3" in the table corresponding to the person ID. When the amount of change in the aspect ratio of the face region of the person for a period from the time tn1 to the time tn3 is not equal to or greater than the first threshold value, or when the decrease in the proportion of the area of the eye region is not equal to or greater than the second threshold value, the spontaneity determination unit 154 registers the face direction change "no" in the record corresponding to the time "tn3" in the table corresponding to the person ID.

After registering information in the face direction change check database 143e, the spontaneity determination unit 154 performs the fifth spontaneity determination process. The process of the spontaneity determination unit 154 determining whether the face of the person 10b is included in the field of view of the person 10a is the same as the process described in the second spontaneity determination process.

The "sixth spontaneity determination process" performed by the spontaneity determination unit 154 will be described. When performing the sixth spontaneity determination process, the spontaneity determination unit 154 performs the process with reference to the mouth moving state check database 143f illustrated in FIG. 11.

The spontaneity determination unit 154 determines whether the distance between the person 10a and the person 10b is equal to or less than a threshold value and the condition in which the mouth of the person 10a and the mouth of the person 10b are alternately opened is satisfied. Then, when the condition is satisfied and the current gaze target of the person 10a is the same as the gaze target of the person 10b for a period from a predetermined time ago to the present, the spontaneity determination unit 154 determines that the person 10a does not spontaneously gaze at the gaze target.

When the distance between the person 10a and the person 10b is equal, to or less than the threshold, value and the condition in which the mouth of the person 10a and the mouth of the person 10b are alternately opened is not satisfied, the spontaneity determination unit 154 determines that the person 10a spontaneously gazes at the gaze target. When the current, gaze target of the person 10a is different from the gaze target of the person 10b for the period from the predetermined time ago to the present, the spontaneity determination unit 154 determines that, the person 10a spontaneously gazes at the gaze target.

Here, an example of the process of the spontaneity determination unit 154 determining whether the distance between a person and another person is equal to or less than a threshold value will be described. For example, as in the second spontaneity determination process, the spontaneity determination unit 154 estimates the positions of each person and determines whether the distance between the persons is equal to or less than the threshold value. The spontaneity determination unit 154 performs the above-mentioned process for each frame and registers distance information in the tables 25a and 25b illustrated in FIG. 11. The distance may be the shortest distance among the distances between the person and other persons.

An example of the process of the spontaneity determination unit 154 determining whether the mouth of a person and the mouth of another person, are alternately opened will be described. The spontaneity determination unit 154 specifies a person region of the person with reference to the image database 141 and extracts a face region from the person region. For example, the spontaneity determination unit 154 specifies a flesh color region and the face region of the person region and extracts a mouth region from the face region.

The spontaneity determination unit 154 calculates the distance between the centers of gravity of the mouth regions and the amount of change in the mouth region in the vertical direction in two consecutive frames and determines that the mouth is opened when the amount of change is equal to or greater than a threshold value. In addition, when the amount of change is less than the threshold value, the spontaneity determination unit 154 determines that the mouth is closed. The spontaneity determination unit 154 performs the above-mentioned process for each frame and registers the state of the mouth in the tables 25a and 25b illustrated in FIG. 11.

The spontaneity determination unit 154 scans each record of the mouth moving state check database 143f, compares the state of the mouth of the person 10a with the state of the mouth of the person 10b, and determines whether the mouth of the person 10a and the mouth of the person 10b are alternately opened. For example, when the mouth of a person is "opened" and the mouth of another person is "closed" at the same time, the spontaneity determination unit 154 may determine that the mouths are alternately Opened.

The "seventh spontaneity determination process" performed by the spontaneity determination unit 154 will be described. When performing the seventh spontaneity determination process, the spontaneity determination unit 154 performs the process with reference to the gaze moving state check database 143g illustrated in FIG. 12.

When the gaze of the person 10b is detectable, the person 10b is included in the field of view of the person 10a, and the current gaze target of the person 10a is the same as the gaze target of the person 10b for a period from a predetermined time ago to the present, the spontaneity determination unit 154 determines that the person 10a does not spontaneously gaze at the gaze target.

On the other hand, when the gaze of the person 10b is not detectable, the spontaneity determination unit 154 determines that the person 10a spontaneously gazes at the gaze target. When the person 10b is not included in the field of view of the person 10a, the spontaneity determination unit 154 determines that the person 10a spontaneously gazes at the gaze target. When the current gaze target of the person 10a is different from the gaze target of the person 10b for the period from the predetermined time, ago to the present, the spontaneity determination unit 154 determines that the person 10a spontaneously gazes at the gaze target.

Here, an example of the process of the spontaneity determination unit 154 determining whether the gaze of a person is detectable will be described. The spontaneity determination unit 154 performs the same gaze detection process as the gaze detection unit 153 and determines whether the gaze of a person is detectable.

For example, when the gaze of the person is detectable in the frame corresponding to the time tn1, the spontaneity determination unit 154 registers the gaze detection "yes" in the record corresponding to the time "tn1" in the table corresponding to the person ID. When the gaze of the person is not detectable in the frame corresponding to the time tn1, the spontaneity determination unit 154 registers the gaze detection "no" in the record corresponding to the time "tn1" in the table corresponding to the person ID.

After registering information in the gaze moving state check database 143g, the spontaneity determination unit 154 performs the seventh spontaneity determination process. The process of the spontaneity determination unit 154 determining whether the face of the person 10b is included in the field of view of the person 10a is the same as the process described in the second spontaneity determination process, The spontaneity determination unit 154 performs one or more of the first to seventh spontaneity determination processes. The spontaneity determination unit 154 counts the determination results of each spontaneity determination process and finally determines whether a person spontaneously gazes at a gaze target on the basis of the majority of the determination results indicating "there is spontaneity" and "there is no spontaneity". The spontaneity determination unit 154 determines whether there is spontaneity for each frame and registers the determination result in the determination result database 144.

For example, when it is determined that the person with the person ID "1aaa" spontaneously gazes at a gaze target product "product α" at the time t1, the spontaneity determination unit 154 registers information written in the record in the first row illustrated in FIG. 13 and sets the spontaneity flag to "on".

Figure 15:
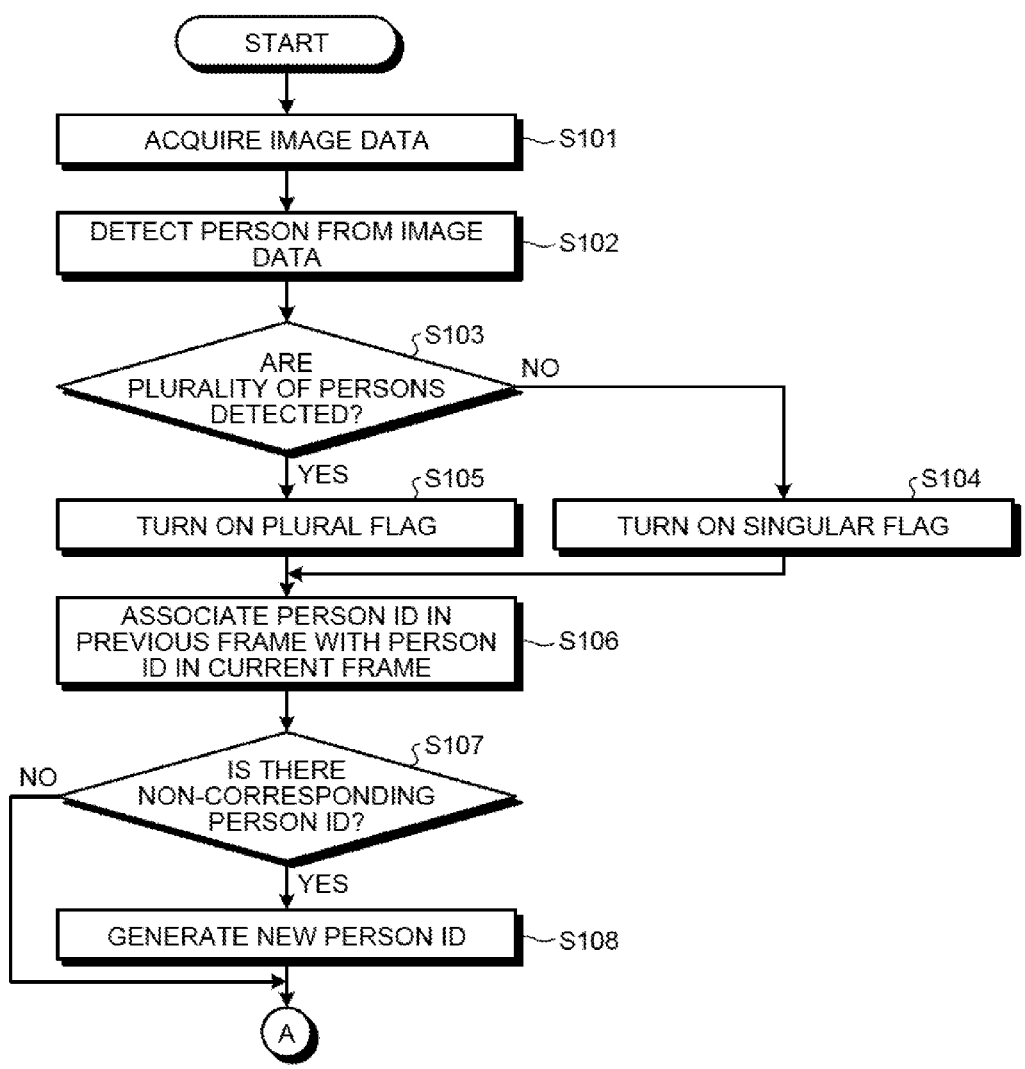
FIG. 15 is a flowchart (1) illustrating a process of the interest degree determination device according to this embodiment.
Figure 16:
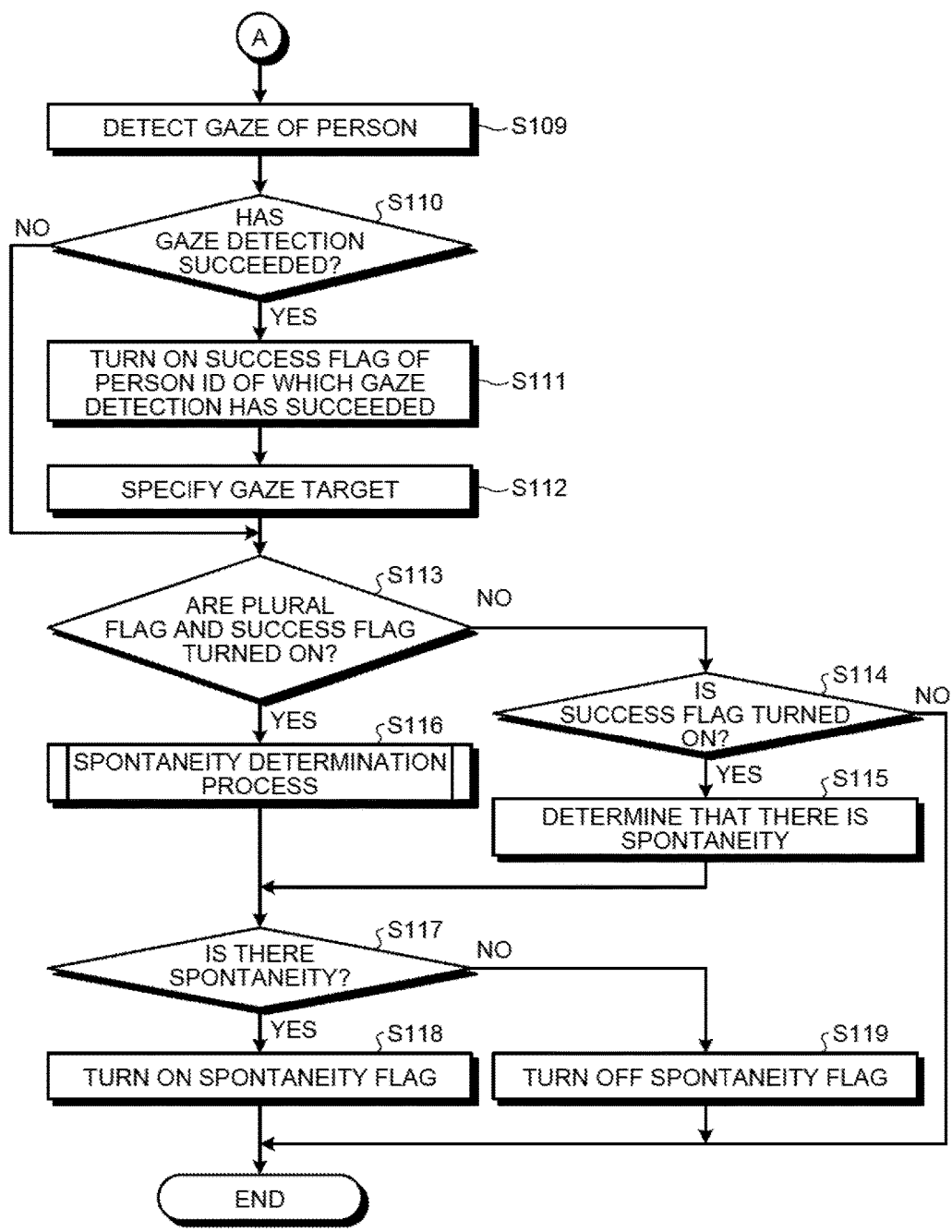
FIG. 16 is a flowchart (2) illustrating the process of the interest degree determination device according to this embodiment.

Next, the process of the interest degree determination device 100 according to this embodiment will be described. FIGS. 15 and 16 are flowcharts illustrating the process of the: interest degree determination device according to this embodiment. As illustrated in FIG. 15, the acquisition unit 151 of the interest degree determination device 100 acquires image data from the camera, (step S101). The person detection unit 152 of the interest degree determination device 100 detects a person from the image data (step S102).

The person detection unit 152 determines whether a plurality of persons have been detected (step S103). When a plurality of persons have not been detected (step S103, No), the person detection unit 152 sets the singular flag of the image database 141 to "on" (step S104). Then, the process proceeds to step S106.

On the other hand, when a plurality of persons have been detected (step S103, Yes), the person detection unit 152 sets the plural flag of the image database 141 to "on" (step S105). The person detection unit 152 associates a person ID in the previous frame with a person ID in the current frame (step S106).

The person detection unit 152 determines whether there is a non-corresponding person ID (step S107). When a non-corresponding person ID is absent (step S107, No), the person detection unit 152 proceeds to step S109 in FIG. 16.

When there is a non-corresponding person ID (step S107, Yes), the person detection unit 152 generates a new person ID (step S108) and proceeds to step S109 in FIG. 16.

The description will be made with reference to FIG. 16. The gaze detection unit 153 of the interest degree determination device 100 detects the gaze of the person (step S109). The gaze detection unit 153 determines whether gaze detection has succeeded (step S110). When gaze detection has failed (step S110, No), the gaze detection unit 153 proceeds to step S113.

When gaze detection has succeeded (step S110, Yes), the gaze detection unit 153 sets the success flag corresponding to the person ID of the person, of which the gaze detection has succeeded, to "on" (step S111). The gaze detection unit 153 specifies a gaze target on the basis of a gaze position and the gaze target position database (step S112).

The spontaneity determination unit 154 of the interest degree determination device 100 determines whether the plural flag and the success flag are on, with reference to the image database 141 (step S113). When the plural flag and the success flag are on (step S113, Yes), the spontaneity determination unit 154 proceeds to step S116. On the other hand, when the plural flag is off or the success flag is off (step S113, No), the spontaneity determination unit 154 proceeds to step S114.

Step S114 will be described. The spontaneity determination unit 154 determines whether, the success, flag is on (step S114). When the success flag is on (step S114, Yes), the spontaneity determination unit 154 determines that there, is spontaneity (step S115) and proceeds to step S117.

When the success flag is off (step S114, No), the spontaneity determination unit 154 ends the process.

Step S116 will be described. The spontaneity determination unit 154 performs a spontaneity determination process (step S116). The spontaneity determination unit 154 determines whether there is spontaneity (step S117). When there is spontaneity (step S117, Yes), the spontaneity determination unit 154 sets the spontaneity flag to "on" (step S118). When there is no spontaneity (step S117, No), the spontaneity determination unit 154 sets the spontaneity flag to "off" (step S113).

Next, the procedure of the spontaneity determination process in step S116 of FIG. 16 will be described. Hereinafter, as the spontaneity determination process, the first to seventh spontaneity determination processes will be sequentially described.

Figure 17:
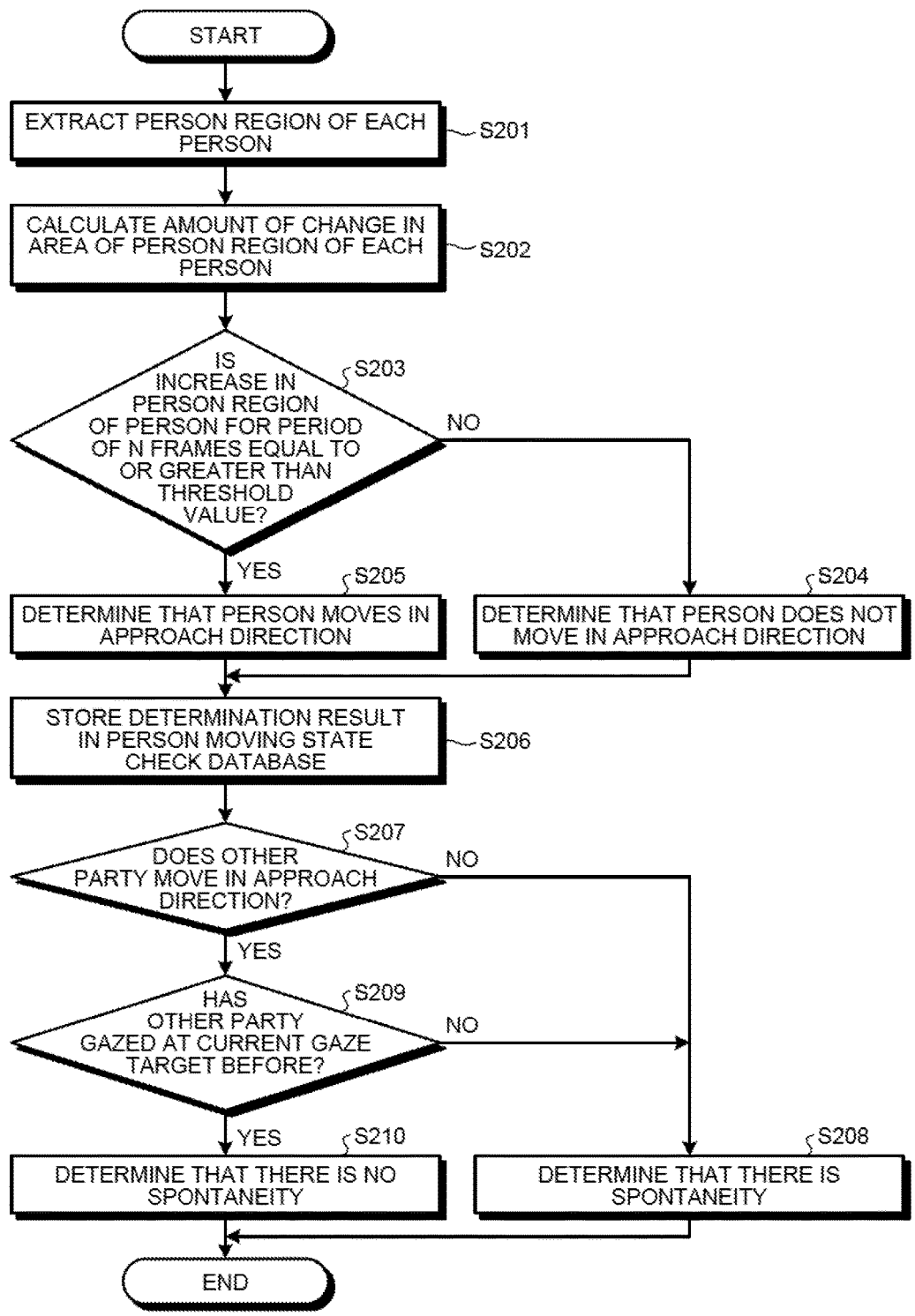
FIG. 17 is a flowchart illustrating the procedure of a first spontaneity determination process.

FIG. 17 is a flowchart illustrating the procedure of the first spontaneity determination process. As illustrated in FIG. 17, the spontaneity determination unit 154 extracts a person region of each person from the image data (step S201). The spontaneity determination unit 154 calculates the amount of change in the area of the person region of each person (step S202).

When an increase in the person region of the person for a period of M frames is not equal to or greater than a threshold value (step S203, No), the spontaneity determination unit 154 determines that the person does not move in an approach direction (step S204) and proceeds to step S206.

On the other hand, when the increase in the person region of the person for a period of N frames is equal to or greater than the threshold value (step S203, Yes), the spontaneity determination unit 154 determines that the person moves in the approach direction (step S205).

The spontaneity determination unit 154 stores the determination result in the person moving state check database 143a (step S206). When the other party does not move in the approach direction (step S207, No), the spontaneity determination unit 154 determines that there is spontaneity (step S208).

When the other party moves in the approach direction (step S207, Yes), the spontaneity determination unit 154 determines whether the other party has gazed at the current gaze target before (step S209). When the other party has gazed at the current gaze target before (step S209, Yes), the spontaneity determination unit 154 determines that there is no spontaneity (step S210).

When the other party has not gazed at the current gaze target before; (step S209, No), the spontaneity determination unit 154 proceeds to step S208.

Figure 18:
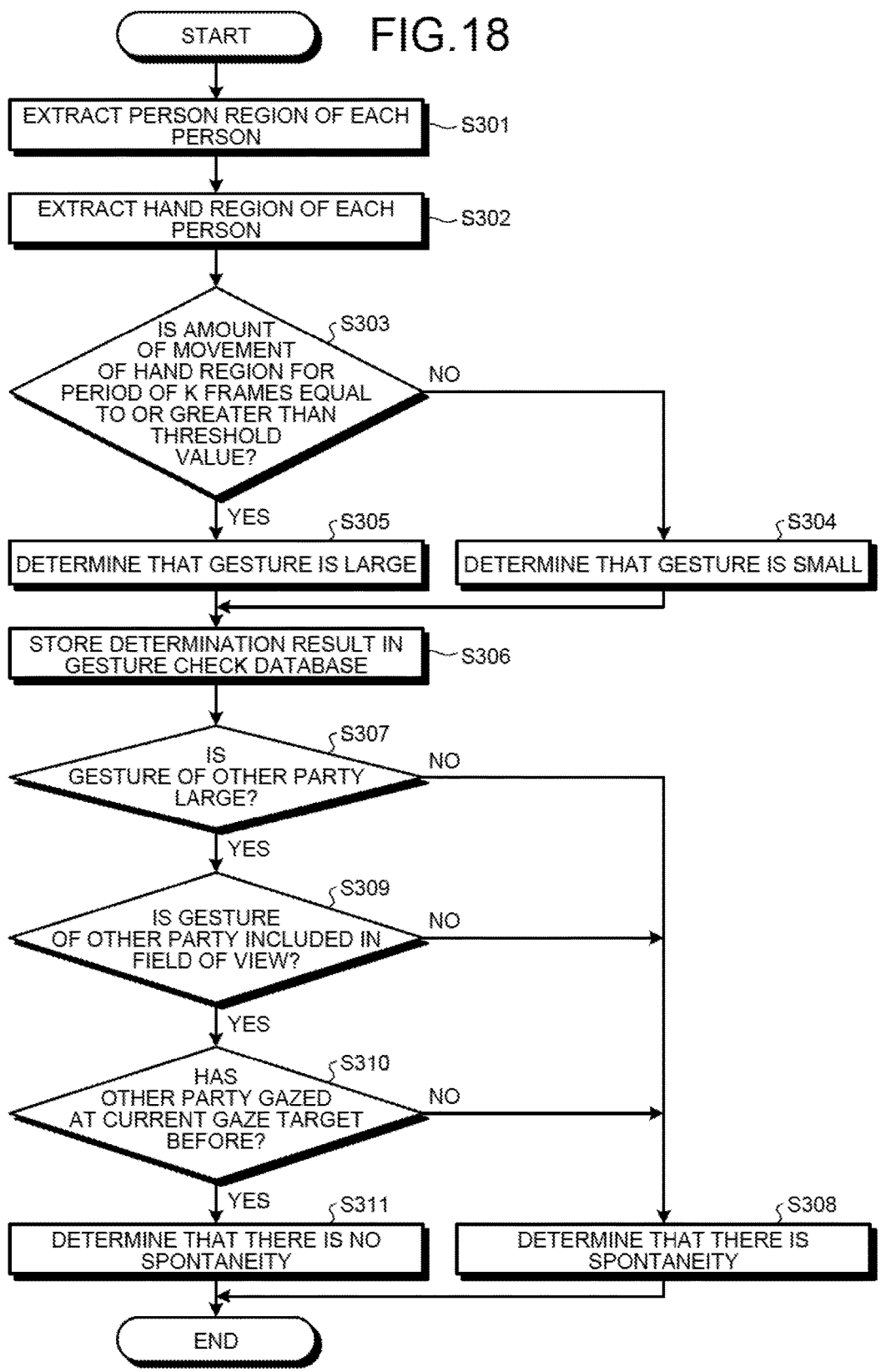
FIG. 18 is a flowchart illustrating the procedure of a second spontaneity determination process.

FIG. 18 is a flowchart illustrating the procedure of the second spontaneity determination process. As illustrated in FIG. 18, the spontaneity determination unit 154 extracts a person region of each person from the image data (step S301). The spontaneity determination unit 154 extracts a hand region of each person (step S302).

When the amount of movement, of the hand region for a period of K frames is not equal to or greater than a threshold value (step S303, No), the spontaneity determination unit 154 determines that the gesture of the person is small (step S304) and proceeds to step S306.

On the other hand, when the amount of movement of the hand region for a period of K frames is equal to or greater than the threshold value (step S303, Yes), the spontaneity determination unit 154 determines that the gesture of the person is large (step S305). The spontaneity determination unit 154 stores the determination result in the gesture check database 143b (step S306).

When the gesture of the other party is not large (step S307, No), the spontaneity determination unit 154 determines that there is spontaneity (step S308).

On the other hand, when the gesture of the other party is large (step S307, Yes), the spontaneity determination unit 154 determines whether, the gesture of the other party is included in the field of view (step S309). When the gesture of the other party is not included in the field of view (step S309, No), the spontaneity determination unit 154 proceeds to step S308.

On the other hand, when the gesture of the other party is included in the field of view (step S309, Yes), the spontaneity determination unit 154 determines whether the other party has gazed at the current gaze target before (step S310). When the other party has gazed at the current gaze target before (step S310, Yes), the spontaneity determination unit 154 determines that there is no spontaneity (step S311).

When the other party has not gazed at the current gaze target, before (step S310, No), the spontaneity determination unit 154 proceeds to step S308.

Figure 19:
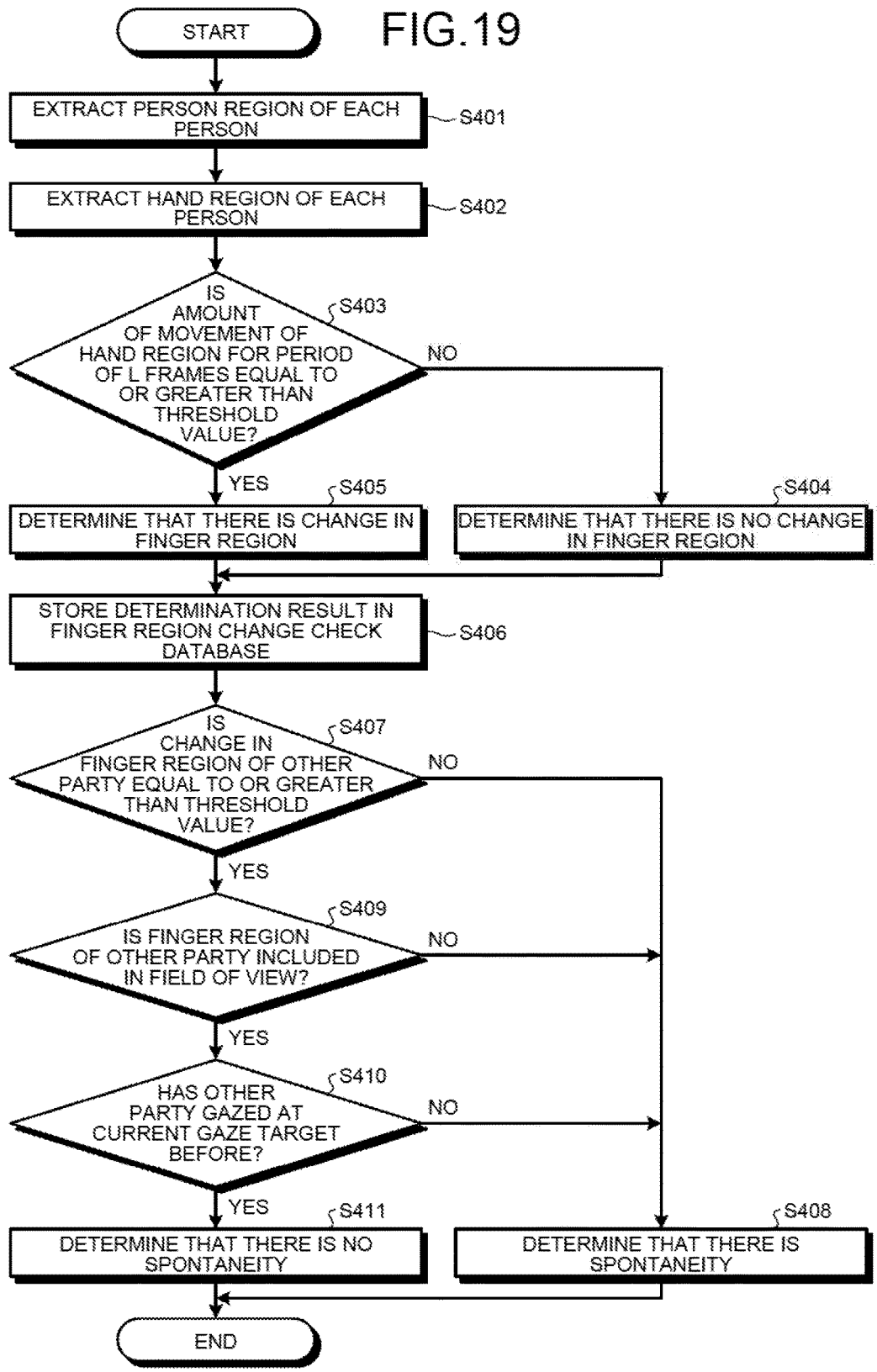
FIG. 19 is a flowchart illustrating the procedure of a third spontaneity determination process.

FIG. 19 is a flowchart, illustrating the procedure of the third spontaneity determination process. As illustrated in FIG. 19, the spontaneity determination unit 154 extracts a person region of each person from image data (step S401). The spontaneity determination unit 154 extracts a hand region of each person (step S402).

When the amount of movement of the hand region for a period of L frames is not equal to or greater than a threshold value (step S403, No), the spontaneity determination unit 154 determines that there is no change in the finger region for the period (step S404) and proceeds to step S406.

On the other hand, when the amount of movement of the hand region for a period of L frames is equal to or greater than the threshold value (step S403, Yes), the spontaneity determination unit 154 determines that there is a change in the finger region (step S405). The spontaneity determination unit 154 stores the determination result in the finger region change check database 143c (step S406).

When a change in the finger region of the other party is not equal to or greater than a threshold value (step S407, No), the spontaneity determination unit 154 determines that there is spontaneity (step S408).

When the change in the finger region of the other party is equal to or greater than the threshold value (step S407, Yes), the spontaneity determination unit 154 determines whether the finger region of the other party is included in the field of view (step S409). When the finger region of the other party is included in the field of view (step S409, Yes), the spontaneity determination unit 154 determines whether the other party has gazed at the current gaze target before; (step S410). When the other party has gazed at the current gaze target before (step S410, Yes), the spontaneity determination unit 154 determines that, there is no spontaneity (step S411).

When the other party has not gazed at the current gaze target, before (step S410, No), the spontaneity determination unit 154 proceeds to step S408. When the finger region of the other party is not included in the field of view (step S409, No), the spontaneity determination unit 154 proceeds to step S408.

Figure 20:
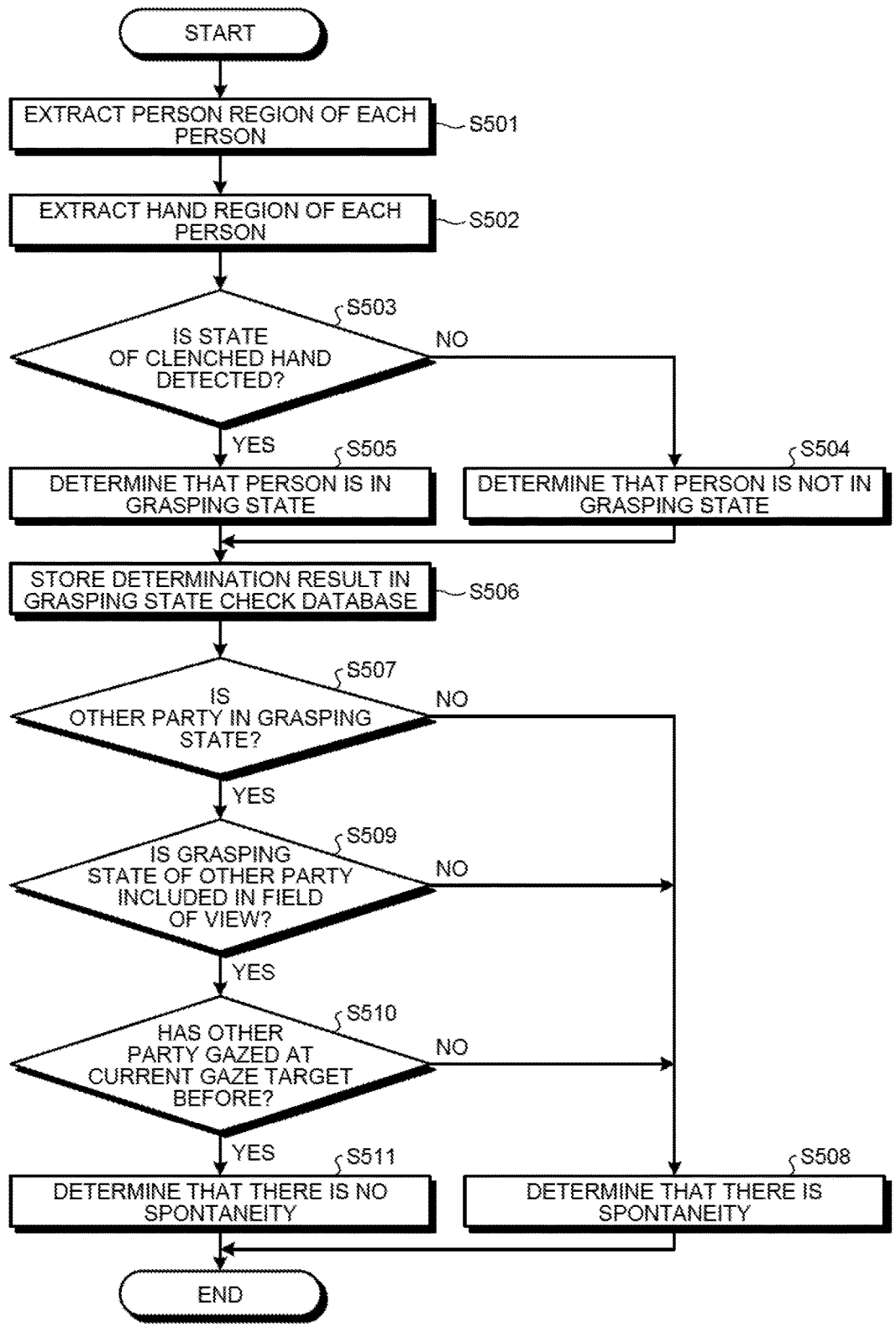
FIG. 20 is a flowchart illustrating the procedure of a fourth spontaneity deterimination process.

FIG. 20 is a flowchart, illustrating the procedure of the fourth spontaneity determination process. As illustrated in FIG. 20, the spontaneity determination unit 154 extracts a person region of each person from image data (step S501).

The spontaneity determination unit 154 extracts a hand region of each person (step S502).

When the state of a clenched hand is not detected (step S503, No), the spontaneity determination unit 154 determines that the person is not in a grasping state (step S504) and proceeds to step S506.

When the state of the clenched hand is detected (step S503, Yes), the spontaneity determination unit 154 determines that, the person is in the grasping state (step S505). The spontaneity determination unit 154 stores the determination result in the grasping state check database 143d (step S506).

When the other party is not in a grasping state (step S507, No), the spontaneity determination, unit 154 determines that there is spontaneity (step S508).

On the other hand, when the other party is in a grasping state (step S507, Yes), the spontaneity determination unit 154 determines whether the grasping state of the other party is included in the field of view (step S509). When the grasping state of the other party is not included in the field of view (step S509, No), the spontaneity determination unit 154 proceeds to step S508.

On the other hand, when the grasping state of the other party is included in the field of view (step S509, Yes), the spontaneity determination unit 154 determines whether the other party has gazed at the current gaze target before (step S510). When the other party has gazed at the current gaze target before (step S510, Yes), the spontaneity determination unit 154 determines that there is no spontaneity (step S511).

When the other party has not gazed at the current gaze target before (step S510, No), the spontaneity determination unit 154 proceeds to step S508.

Figure 21:
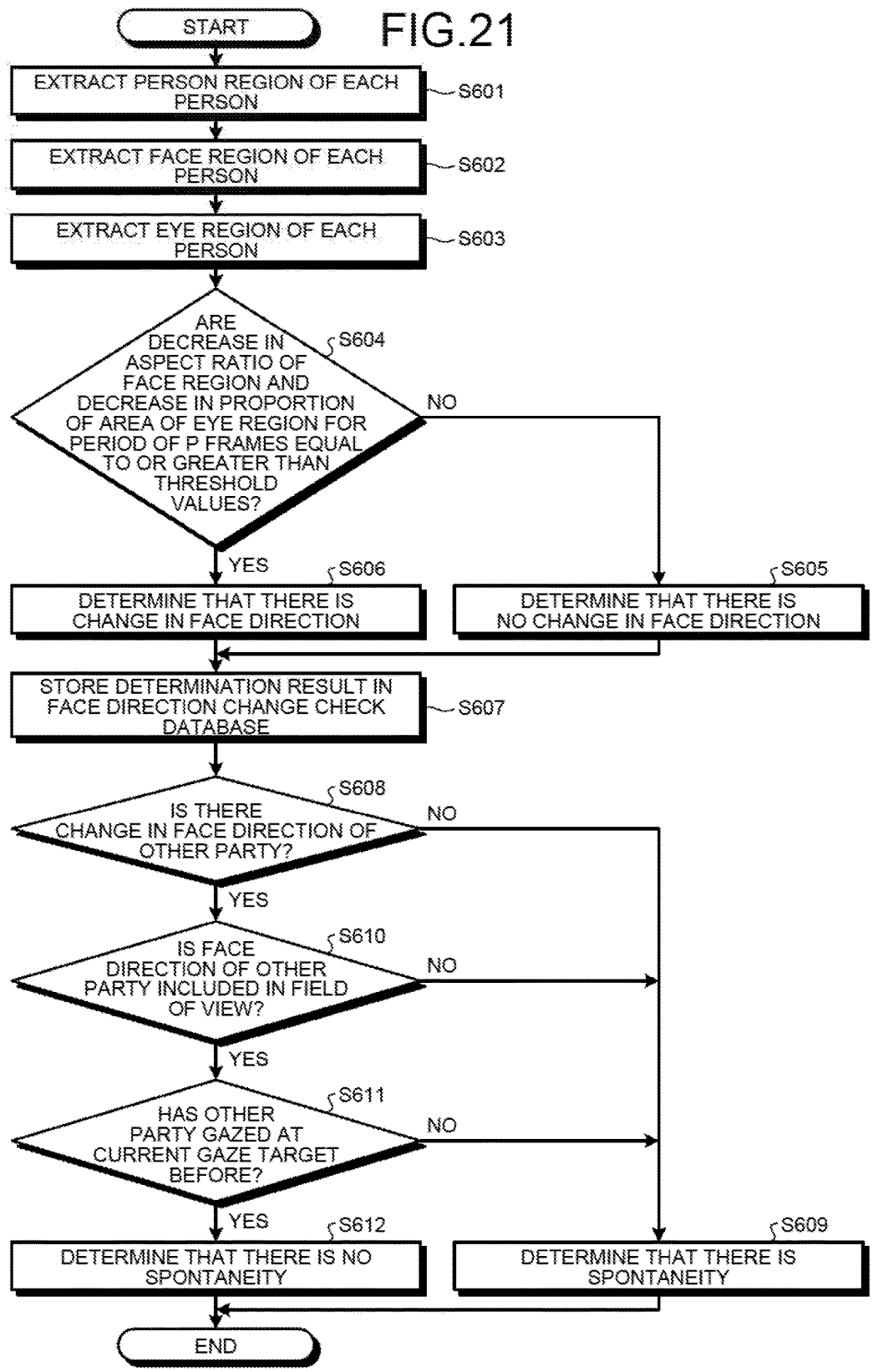
FIG. 21 is a flowchart illustrating the procedure of a fifth spontaneity determination process.

FIG. 21 is a flowchart illustrating the procedure of the fifth spontaneity determination process. As illustrated in FIG. 21, the spontaneity determination unit 154 extracts a person region of each person from image data, (step S601). The spontaneity determination unit 154 extracts a face region of each person (step S602) and extracts an eye region of each person (step S603).

When a decrease in the aspect ratio of the face region and a decrease in the proportion of the area of the eye region for a period of P frames are not equal to or greater than threshold values (step S604, No), the spontaneity determination unit 154 determines that there is no change in the face direction (step S605) and proceeds to step S607.

When the decrease in the aspect ratio of the face region and the decrease in the proportion of the area of the eye region for a period of P frames are equal to or greater than the threshold values (step S604, Yes), the spontaneity determination unit 154 determines that there is a change in the face direction (step S606). The spontaneity determination unit 154 stores the determination result in the face direction change check database 143e (step S607).

When there is no change in the face direction of the other party (step S608, No), the spontaneity determination unit 154 determines that there is spontaneity (step S609).

When there is a change in the face direction of the other party (step S608, Yes), the spontaneity determination unit 154 determines whether the face direction of the other party is included in the field of view (step S610). When, the face direction of the other party is not included in the field, of view (step S610, No), the spontaneity determination unit 154 proceeds to step S609.

On the other hand. When the face direction of the other party is included in the field of view (step S610, Yes), the spontaneity determination unit 154 determines whether the other party has gazed at the current gaze target before (step S611). When the other party has gazed at the current gaze target before (step S611, Yes), the spontaneity determination unit 154 determines that there is no spontaneity (step S612).

When the other party has not gazed at the current gaze target before (step S611, No), the spontaneity determination unit 154 proceeds to step S603.

Figure 22:
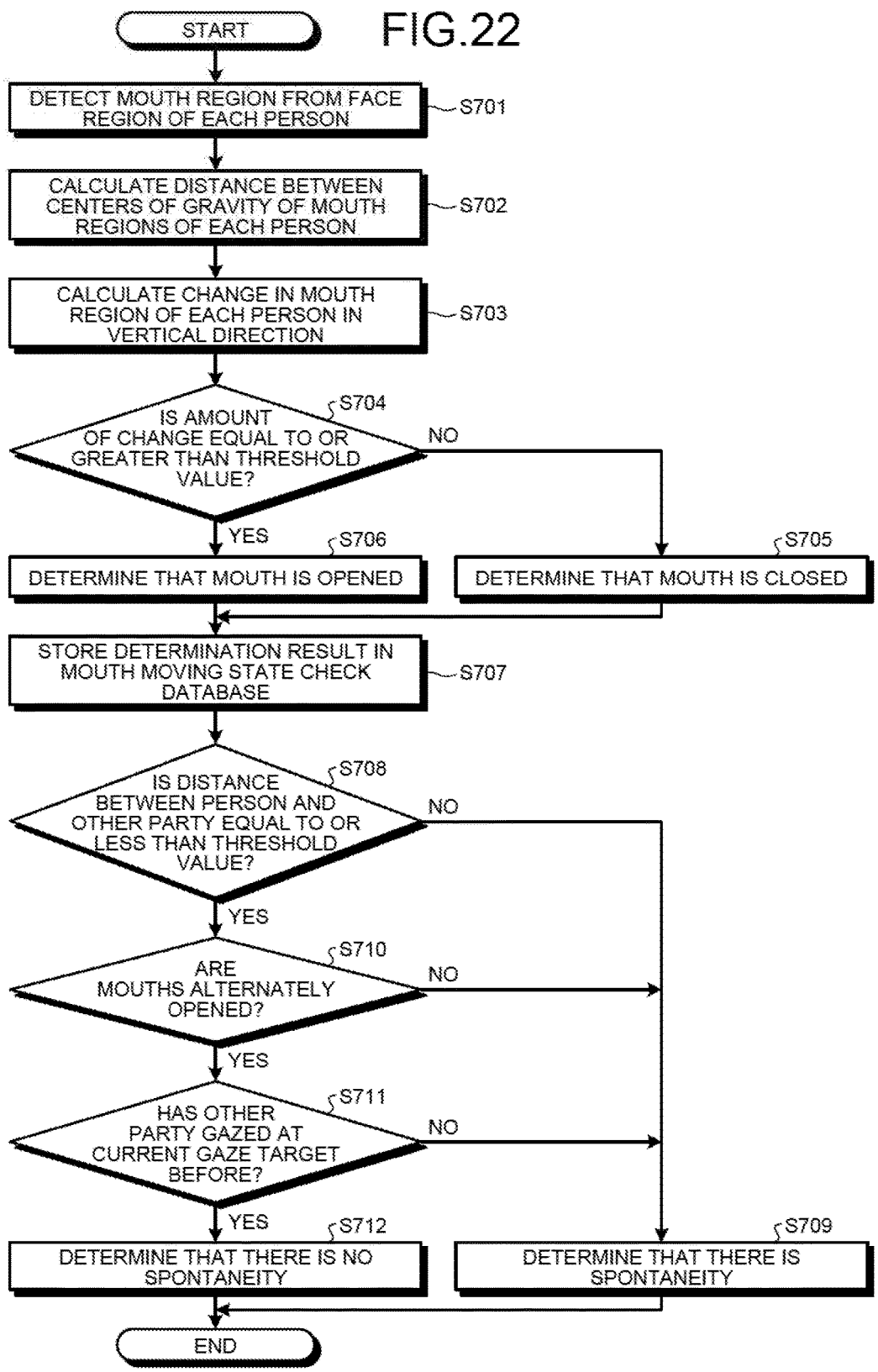
FIG. 22 is a flowchart illustrating the procedure of a sixth spontaneity determination process.

FIG. 22 is a flowchart illustrating the procedure of the sixth spontaneity determination process. As illustrated in FIG. 22, the spontaneity determination unit 154 detects a mouth region from the face region of each person (step S701) and calculates the distance between the centers of gravity of the mouth regions of each person (step S702).

The spontaneity determination unit 154 calculates a change in the mouth region of each person in the Vertical direction (step S703). When, the amount of change is not equal to or greater than a threshold value (step S704, No), the spontaneity determination unit 154 determines that the mouth is closed (step S705) and proceeds to step S707.

On the other hand, when the amount of change is equal to or greater than the threshold value (step S704, Yes), the spontaneity determination unit 154 determines that the mouth is opened (step S706) and stores the determination result in the mouth moving state check database 143*f* (step S707).

When the distance between a person and the other party is not equal to or less than a threshold value (step S708, No), the spontaneity determination unit 154 determines that there is spontaneity (step S709).

On the other hand, when the distance between the person and the other party is equal to or less than the threshold value (step S708, Yes), the spontaneity determination unit 154 determines whether the mouths are alternately opened (step S710). When the mouths are not alternately opened (step S710, No), the spontaneity determination unit 154 proceeds to step S709.

When the mouths are alternately opened (step S710, Yes), the spontaneity determination unit 154 determines whether the other party has gazed at the current gaze target before (step S711). When the other party has gazed at the current gaze, target before (step S711, Yes), the spontaneity determination unit 154 determines that, there is no; spontaneity (step S712).

When the other party has not gazed at the current gaze target before (step S711, No), the spontaneity determination unit 154 proceeds to step S709.

Figure 23:
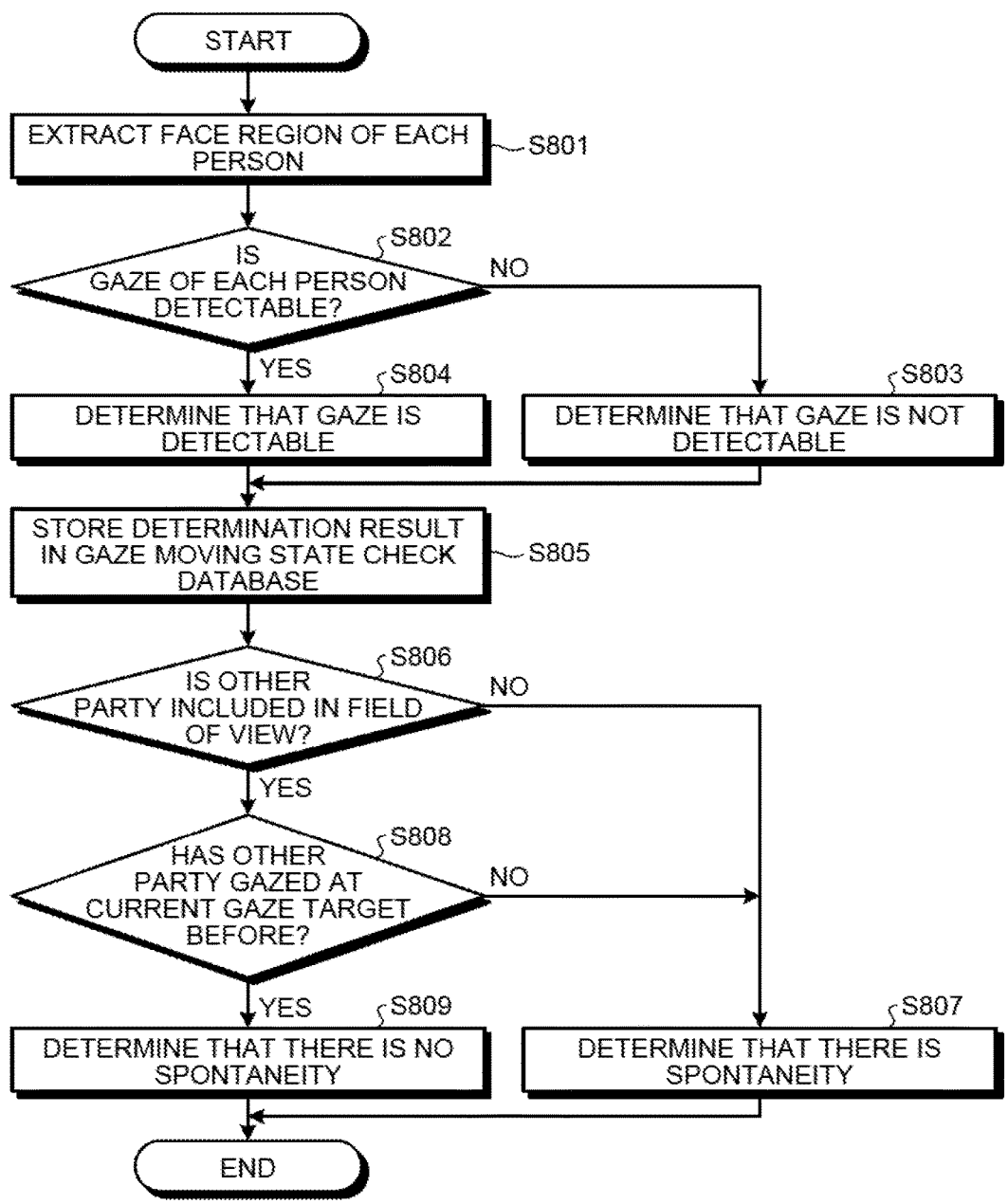
FIG. 23 is a flowchart illustrating the procedure of a seventh spontaneity determination process.

FIG. 23 is a flowchart illustrating the procedure of the seventh spontaneity determination process. As illustrated in FIG. 23, the spontaneity determination unit 154 extracts a face region of each person (step S801) and determines whether the gaze of each person is detectable (step S802).

When the gaze of each person is not detectable (step S802, No), the spontaneity determination unit 154 determines that gaze detection is not possible (step S803) and proceeds to step S805.

On the other hand, when the gaze of each person is detectable (step S802, Yes), the spontaneity determination unit 154 determines that gaze detection is possible (step S804). The spontaneity determination unit 154 stores the determination result in the gaze moving state check database 143*g* (step S805).

When the other party is not in a gaze range (step S806, No), the spontaneity determination unit 154 determines that there is spontaneity (step S807).

On the other hand, when the other party is in the gaze range, (step S806, Yes), the spontaneity determination, unit 154 determines whether the other party has gazed at the current gaze target before (step S808). When the other party has gazed at the current gaze target before (step S808, Yes), the spontaneity determination unit 154 determines that there is no spontaneity (step S809).

When the other party has not gazed at the current gaze target before (step S808, No), the spontaneity determination unit 154 proceeds to step S807.

Next, the effect of the interest degree determination device 100 according to this embodiment will be described. When there is another person in the vicinity of a person, the interest degree determination device 100 determines whether the gaze position of the person has been affected by another person and stores the determination result and the gaze position of the person so as to be associated with each other. Therefore, according to the interest degree determination device 100, it is possible to determine whether the person spontaneously gazes at a target. That is, it is possible to determine whether a person has an interest in a certain object due to the influence of another person.

For example, when another person moves in the direction of a product on the basis of the image information of a plurality of frames, the interest degree determination device 100 determines that the gaze position of a person has been affected by another person. For example, in some cases, the gaze position is moved with the movement of the other party. Therefore, it is possible to determine whether a person spontaneously gazes at a target on the basis of the moving direction of another person.

When the gesture of another person is large and is included in the field of view of a person on the basis of the image information of a plurality of frames, the interest degree determination device 100 determines that the gaze position of the person has been affected by another person. In some cases, the gaze position is moved according to the gesture of the other party. Therefore, it is possible to determine whether a person spontaneously gazes at a target on the basis of the gesture of another person.

When there is a change in the fingers of another person and the fingers are included in the field of view of a person on the basis of the image information of a plurality of frames, the interest degree determination device 100 determines that the gaze position of the person has been affected by another person. In some cases, the gaze position is moved according to, for example, the finger-pointing of the other party. Therefore, it is possible to determine whether a person, spontaneously gazes at a target on the basis of a change in the fingers of another person.

When the hand region of another person has a predetermined shape, such as a clenched shape, and the hand region of another person is included in the field of view of a person on the basis of image information, the interest degree determination device 100 determines that the gaze position of the person has been affected by another person. For example, in some cases, when another person grasps a product, the gaze position of the person is moved to the product. Therefore, it is possible to determine whether a person spontaneously gazes at a target on the basis of whether the hand of another person has a predetermined shape.

When the face direction of another person is changed and the face region of another person is included in the field of view of a person on the basis of image information of a plurality of frames, the interest, degree determination device 100 determines that the gaze position of the person has been affected by another person. For example, in some cases, when the face direction of another person is changed, another person talks with the person and the gaze position of the person is affected by another person. Therefore, it is possible to determine whether a person spontaneously gazes at a target on the basis of a change in the face direction of another person.

When the mouth of a person and the mouth of another person are alternately opened on the basis of a mouth region of the person and a mouth region of another person included in the image information of a plurality of frames, the interest degree determination device 100 determines that the gaze position of the person has been affected by another person. For example, in some cases, when the mouth of the person and the mouth of another person are alternately opened, they are likely to talk with each other and the gaze position of the person is affected by the talk. Therefore, it is possible to determine whether a person spontaneously gazes at a target on the basis of the mouth region. In addition, it is determined whether a person talks with another person, in image processing. Therefore, it is not needed to provide, for example, a microphone and thus to reduce costs.

The interest degree determination device 100 is characterized in that it further detects the gaze position of another person and determines that the gaze position of a person has been affected by another person when the gaze position of the person is included in a predetermined range including the gaze position of another person. In some cases, the gaze position of a person is moved with the movement of the gaze position of another person. Therefore, it is possible to determine whether a person spontaneously gazes at a target on the basis of the gaze position of another person.

Figure 24:
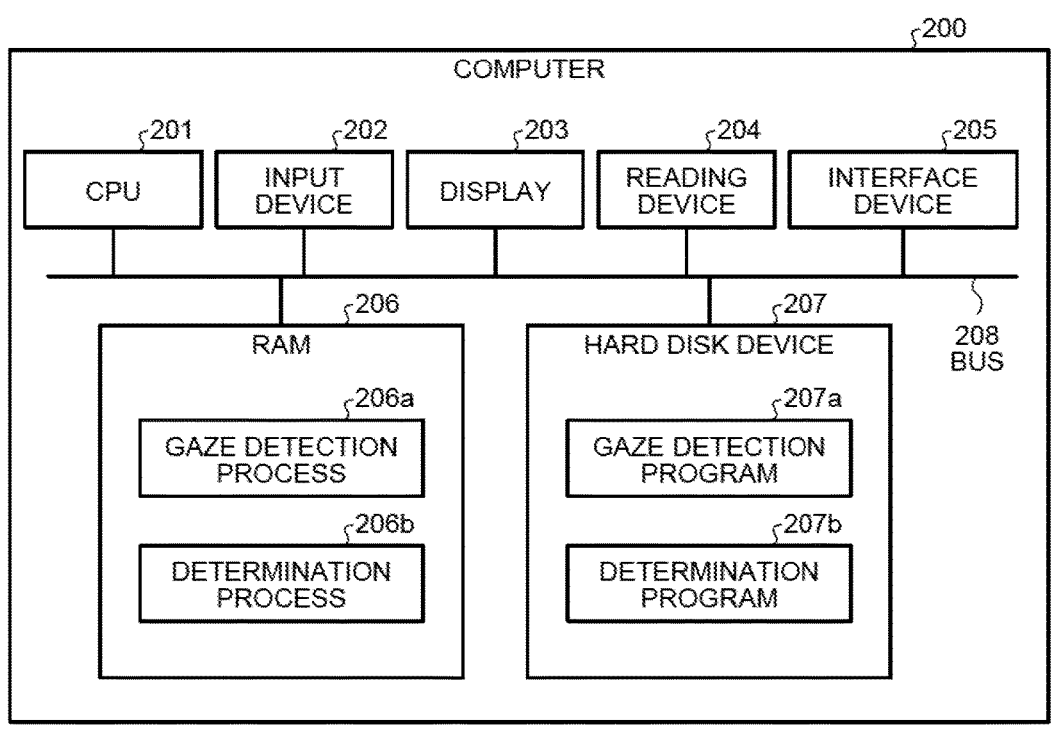
FIG. 24 is a diagram illustrating an example of a computer that executes an interest degree determination program.

Next, an example of a computer that executes an interest degree determination program for implementing the same functions as those of the interest degree determination device 100 according to; the above-described embodiment will be described. FIG. 24 is a diagram illustrating an example of the computer that executes the interest degree determination program.

As illustrated in FIG. 24, a computer 200 includes a CPU 201 that performs various operations, an input device 202 that receives data input from a user, and a display 203. In addition, the computer 200 includes a reading device 204 that reads, for example, a program from a storage medium and an interface device 205 that, transmits and receives data to and from other computers through a network. Furthermore, the computer 200 includes a RAM 206 that temporarily stores various kinds of information and a hard disk device 207. Then, the devices 201 to 207 are connected to a bus 208.

The hard disk device 208 has a gaze detection program 207a and a determination program 207b. The CPU 201 reads the gaze detection program 207a and the determination program 207b and develops the read programs in the RAM 206. The gaze detection program 207a functions as a gaze detection process 206a. The determination program 207b functions as a determination process 206b. For example, the gaze detection process 206a corresponds to the process of the gaze detection unit 153. The determination process 206b corresponds to the process of the spontaneity determination unit 154.

The gaze detection program 207a and the determination program 207b are not necessarily stored in the hard disk device 207 at the beginning. For example, each program is stored in a "portable physical medium" inserted into the computer 200, such as a flexible disk (FD), a CD-ROM, a DVD, a magneto-optical disk, or an IC card. Then, the computer 200 may read the gaze detection program 207a and the determination program 207b and execute the read programs.

It is possible to determine whether a person gazes at a certain object due to the influence of other persons.

All examples and conditional language recited herein are intended for pedagogical purposes of aiding the reader in understanding the invention and the concepts contributed by the: inventor to further the art, and are not to; be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An interest degree determination device comprising:
a memory; and
a processor that executes a process comprising:
 detecting a gaze position of a user included in a plurality of users including a first user and a second user, on the basis of image data included on a plurality of frames that are consecutively captured by a camera that is so arranged that an imaging range of the camera includes the first user and the second user that gaze at gaze targets displayed;
 storing, for each of the plurality of users, the detected gaze position that corresponds to a gaze target in association with a time of a frame in the plurality of frames on which the gaze position is detected in a first table within the memory;
 obtaining a field of view of the user based on the detected gaze position;
 determining, when determining that the gaze target of the first user and the gaze target of the second user who is present in the vicinity of the first user have been the same for a predetermined time based on the first table, whether the gaze position of the first user has been affected by the second user based on the obtained field of view of the first user and an action taken by the second user determined from the image data, wherein when the determining determines that the gaze position of the first user has been affected by the second user, a further determination is made that the first user is not spontaneously gazing at the gaze target; and
 storing a determination result of the determining in association with the gaze position of the first user and a time of determination in a second table within the memory.

2. The interest degree determination device according to claim 1, wherein, when an increase in a region of the second user is equal to or greater than a threshold value on the basis of the image data, the determining determines that the gaze position of the first user has been affected by the second user.

3. The interest degree determination device according to claim 1, wherein, when an amount of movement of a hand region of the second user is equal to or greater than a threshold value, and the hand region of the second user is included in the field of view of the first user, on the basis of the image data and the first table, the determining determines that the gaze position of the first user has been affected by the second user.

4. The interest degree determination device according to claim 1, wherein, when an amount of change in a hand region of the second user is equal to or greater than a threshold value, and the hand region of the second user is included in the field of view of the first user, on the basis of the image data and the first table, the determining determines that the gaze position of the first user has been affected by the second user.

5. The interest degree determination device according to claim 1, wherein, when a hand region of the second user has a predetermined shape, and the hand region of the second user is included in the field of view of the first user, on the basis of the image data and the first table, the determining determines that the gaze position of the first user has been affected by the second user.

6. The interest degree determination device according to claim 1, wherein, when a decrease in an aspect ratio of a face region of the second user is equal to or greater than a threshold value, a decrease in an eye region of the second user is equal to or greater than a threshold value, and the face region of the second user is included in the field of view of the first user, on the basis of the image data and the first table, the determining determines that the gaze position of the first user has been affected by the second user.

7. The interest degree determination device according to claim 1, wherein, when a mouth of the first user and a mouth of the second user are alternately opened, on the basis of a mouth region of the first user and a mouth region of the second user included in the image data, the determining determines that the gaze position of the first user has been affected by the second user.

8. The interest degree determination device according to claim 1, wherein, when the gaze position of the first user is included in a predetermined range including the gaze position of the second user on the basis of the image data and the first table, the determining determines that the gaze position of the first user has been affected by the second user.

9. An interest degree determination method using a processor, the method comprising:
   detecting a gaze position of a user included in a plurality of users including a first user and a second user, on the basis of image data included on a plurality of frames that are consecutively captured by a camera that is so arranged that an imaging range of the camera includes the first user and the second user that gaze at gaze targets displayed;
   storing, for each of the plurality of users, the detected gaze position that corresponds to a gaze target in association with a time of a frame in the plurality of frames on which the gaze position is detected in a first table within a storage device;
   obtaining a field of view of the user based on the detected gaze position;
   determining, when determining that the gaze target of the first user and the gaze target of the second user who is present in the vicinity of the first user have been the same for a predetermined time based on the first table, whether the gaze position of the first user has been affected by the second user based on the obtained field of view of the first user and an action taken by the second user determined from the image data, wherein when the determining determines that the gaze position of the first user has been affected by the second user, a further determination is made that the first user is not spontaneously gazing at the gaze target; and
   storing a determination result of the determining in association with the gaze position of the first user and a time of determination in a second table within the storage device.

10. The interest degree determination method according to claim 9, wherein, when an increase in a region of the second user is equal to or greater than a threshold value on the basis of the image data, the determining determines that the gaze position of the first user has been affected by the second user.

11. The interest degree determination method according to claim 9, wherein, when an amount of movement of a hand region of the second user is equal to or greater than a threshold value, and the hand region of the second user is included in the field of view of the first user, on the basis of the image data and the first table, the determining determines that the gaze position of the first user has been affected by the second user.

12. The interest degree determination method according to claim 9, wherein, when an amount of change in a hand region of the second user is equal to or greater than a threshold value, and the hand region of the second user is included in the field of view of the first user, on the basis of the image data and the first table, the determining determines that the gaze position of the first user has been affected by the second user.

13. The interest degree determination method according to claim 9, wherein, when a hand region of the second user has a predetermined shape, and the hand region of the second user is included in the field of view of the first user, on the basis of the image data and the first table, the determining determines that the gaze position of the first user has been affected by the second user.

14. The interest degree determination method according to claim 9, wherein, when a decrease in an aspect ratio of a face region of the second user is equal to or greater than a threshold value, a decrease in an eye region of the second user is equal to or greater than a threshold value, and the face region of the second user is included in the field of view of the first user, on the basis of the image data and the first table, the determining determines that the gaze position of the first user has been affected by the second user.

15. The interest degree determination method according to claim 9, wherein, when a mouth of the first user and a mouth of the second user are alternately opened, on the basis of a mouth region of the first user and a mouth region of the second user included in the image data, the determining determines that the gaze position of the first user has been affected by the second user.

16. The interest degree determination method according to claim 9, wherein, when the gaze position of the first user is included in a predetermined range including the gaze position of the second user on the basis of the image data and the first table, the determining determines that the gaze position of the first user has been affected by the second user.

17. A non-transitory computer-readable recording medium having stored therein an interest degree determination program that causes a computer to execute a process, comprising:
   detecting a gaze position of a user included in a plurality of users including a first user and a second user, on the basis of image data included on a plurality of frames that are consecutively captured by a camera that is so arranged that an imaging range of the camera includes the first user and the second user that gaze at gaze targets displayed;
   storing, for each of the plurality of users, the detected gaze position that corresponds to a gaze target in association with a time of a frame in the plurality of frames on which the gaze position is detected in a first table within a storage device;
   obtaining a field of view of the user based on the detected gaze position;

determining, when determining that the gaze target of the first user and the gaze target of the second user who is present in the vicinity of the first user have been the same for a predetermined time based on the first table, whether the gaze position of the first user has been affected by the second user based on the obtained field of view of the first user and an action taken by the second user determined from the image data, wherein when the determining determines that the gaze position of the first user has been affected by the second user, a further determination is made that the first user is not spontaneously gazing at the gaze target; and storing a determination result of the determining in association with the gaze position of the first user and a time of determination in a second table within the storage device.

* * * * *